United States Patent [19]

Nakahara et al.

[11] Patent Number: 5,526,296
[45] Date of Patent: Jun. 11, 1996

[54] BIT FIELD OPERATING SYSTEM AND METHOD WITH TWO BARREL SHIFTERS FOR HIGH SPEED OPERATIONS

[75] Inventors: Shigeru Nakahara; Shinobu Yabuki; Ryuichi Satomura, all of Ohme, Japan

[73] Assignee: Hitachi, Ltd., Tokyo, Japan

[21] Appl. No.: 339,644

[22] Filed: Nov. 14, 1994

Related U.S. Application Data

[63] Continuation of Ser. No. 877,943, Apr. 28, 1992, abandoned.

[30] Foreign Application Priority Data

| May 8, 1991 | [JP] | Japan | 3-132039 |
| May 15, 1991 | [JP] | Japan | 3-139574 |

[51] Int. Cl.⁶ .................................................. G06F 7/38
[52] U.S. Cl. .................. 364/715.08; 364/736; 364/748; 395/375; 395/800
[58] Field of Search .............................. 395/800, 375; 364/259.5, 259.7, 259.8, 715.08, 736, 748; 340/825.68, 825.87, 825.91

[56] References Cited

U.S. PATENT DOCUMENTS

| 4,488,252 | 12/1984 | Vassar | 364/748 |
| 4,512,018 | 4/1985 | Phelps et al. | 370/112 |
| 4,760,517 | 7/1988 | Miller et al. | 395/800 |
| 4,785,393 | 11/1988 | Chu et al. | 395/375 |
| 4,807,043 | 2/1989 | Kaku et al. | 358/261.3 |
| 4,807,175 | 2/1989 | Tokumaru et al. | 364/754 |
| 4,821,208 | 4/1989 | Ryan et al. | 345/186 |
| 4,829,460 | 5/1989 | Ito | 364/715.08 |
| 4,973,956 | 11/1990 | Lih et al. | 340/825.86 |
| 5,095,460 | 3/1992 | Rodeheffer | 395/650 |
| 5,170,468 | 12/1992 | Shah et al. | 395/166 |
| 5,202,962 | 4/1993 | Matsuo et al. | 395/166 |
| 5,332,995 | 7/1994 | Katsura et al. | 345/121 |

FOREIGN PATENT DOCUMENTS 2-90318  3/1990  Japan .

*Primary Examiner*—Alyssa H. Bowler
*Assistant Examiner*—John Follansbee
*Attorney, Agent, or Firm*—Fay, Sharpe, Beall, Fagan, Minnich & McKee

[57] ABSTRACT

A second barrel shifter whose shift amount is equally controlled as that of a first barrel shifter for shifting input data by an optional bit is employed as a mask data generating circuit in a bit field operational arithmetic unit. Areas with transistor trains of the first and second barrel shifters are formed in parallel to an area having the same width as that of a 1-bit storage cell of a register file and shift amount control lines in both barrel shifters are set for common use so as to reduce the area occupied by a chip. In order to increase the processing speed of extracting an optional area of data, the bit field operational arithmetic unit is provided with a circuit for subjecting all bits to signal expansion in No. 0 bit data in parallel to the shift of input data effected by the first barrel shifter. Moreover, barrel shift circuits include left and right shift circuits as n shift circuits for shifting $2^i$-bit (i=0, 1, 2, . . . , n−1) data, with n as a positive integer. Consequently, an optional number of bits up to $2^n$-bit of input data can thus be shifted by directing fetching n-bit shift control data.

10 Claims, 26 Drawing Sheets

FIRST BARREL SHIFTER

SECOND BARREL SHIFTER (A) PROCESSING OF EXTRACT INSTRUCTION (i) DATA SHIFT PROCESS (ii) MASK DATA GENERATING PROCESS (iii) EXPANSION PROCESS (B) PROCESSING OF DEPOSIT INSTRUCTION (i) DATA SHIFT PROCESS (ii) MASK DATA GENERATING PROCESS (iii) MASK EXECUTION PROCESS

BIT FIELD OPERATING SYSTEM AND METHOD WITH TWO BARREL SHIFTERS FOR HIGH SPEED OPERATIONS

This application is a continuation application of U.S. Ser. No. 07/877,943, filed Apr. 28, 1992, now abandoned.

BACKGROUND OF THE INVENTION

The present invention relates to a bit field operational arithmetic unit and to an operating method as what is effectively applicable to an integer arithmetic unit of a processor.

Bit field operations include, for instance, a process of extracting or replacing an optional area of data. An extract instruction, for instance, is intended to designate the extraction of an optional area of data. In response to the extract instruction, processes shown in FIG. 16 are basically performed. More specifically, (i) a data shift process for shifting an area to be extracted to the rightmost end of the data, (ii) a mask data generating process for generating mask data with "1" set for a bit corresponding to each bit in the area to be extracted, and (iii) an expansion process for fetching only an area whose bit value is 1 out of the mask data and filling the remaining area with 0 or sign bits. To be concrete, No. h bit of input data is shifted in right alignment and any area other than what is defined by area width LEN is expanded with the sign bit S or by filling it with bit 0 to obtain output data with the desired area LEN extracted from the input data. The area to be subjected to sign expansion or 0-expansion is designated by the mask data. A deposit instruction, for instance, is intended to designate the process of replacing the latter. Under this instruction, the processes shown in FIG. 17 are basically performed. More specifically, (i) a data shift process for shifting an area to be replaced to the left up to a position of replacement, (ii) a mask data generating process for generating mask data with "1" set for a bit corresponding to each bit in the area to be replaced, and (iii) a mask expansion process for taking out only an area whose bit value is 1 out of the data thus shifted to write the area onto the data read from a register or data with each bit filled with 0. For instance, the rightmost end of input data is shifted up to No. h bit and the data in the register or part of the data with all bits being 0 is replaced in an area LEN in width from No. h bit of the data thus shifted to obtain output data. The area to be replaced at this time is designated by the mask data. Data 32 bits wide will mainly described in the specification. Although the data 32 bits wide is not restrictive, the least significant bit (LSB) and the most significant bit (MSB) are situated at the rightmost and leftmost ends, respectively. In this case, the most significant bit is defined as No. 0 bit, whereas the least significant bit is defined as No. 31 bit.

With respect to a mask data generating circuit utilizable for the generation of mask data in both of the aforementioned cases, what is shown in FIG. 18 may be considered. This circuit comprises a subtracter SUB, two mask bit generating logic circuits MLOG1, MLOG2, and an AND circuit AND. The subtracter SUB generates a bit position at the leftmost end of an area to be extracted or replaced from data LEND representing area width LEN and data h indicating a bit position h on the lower side of the area width. The mask bit generating logic circuit MLOG1 generates data filled with 1 from the leftmost end of the area up to the least significant bit, whereas the mask bit generating logic circuit MLOG2 generates data filled with 1 from the rightmost end of the area up to the most significant bit. The AND circuit AND generates the mask data utilized for mask execution and sign expansion by ANDing these data. There is shown in FIG. 18 an exemplary process of generating mask data for the deposit instruction. The mask data for the extract instruction is generated by replacing No. h bit with No. 31 bit.

SUMMARY OF THE INVENTION

In a process of dealing with graphic data where bits or areas of data correspond to pixels, that is, in a graphic process for moving images, for instance, the contents of an area of the data may be copied into a desired area of different data. In such a case, the number of instruction execution cycles can be reduced by a large margin by applying the extract and deposit instructions to that process. When a bit field operational arithmetic unit is employed as special hardware for use in executing those instructions, there may arise the necessity of providing, in addition to the mask data generating circuit, a barrel shifter for shifting a given number of bits of data and a circuit for subjecting the data thus shifted to sign expansion or masking based on the mask data. The present inventors have examined the feasibility of incorporating such a bit field operational arithmetic unit into an RISC processor. However, the fact that the area occupied by the mask data generating circuit of FIG. 18 accounts for about 20% of the whole bit field operational arithmetic unit obviously results in increasing the chip area.

When the area width LEN extends to the left across No. 0 bit of the input data under the extract instruction, No. 0 bit is treated as a sign bit in the case of sign expansion in the output data. If the area LEN is shifted in right alignment during the initial barrel shift process, No. 0 bit of the input data may not be designated at the time of sign expansion based on the mask data. Consequently, it has been examined to perform the barrel shift process by generating sign expansion data with No. 0 bit of the input data distributed to all bits and supplying the expansion data and the input data to the barrel shifters. However, the present inventors have found that if the barrel shift process is performed after No. 0 bit is distributed to all the bits to generate the sign expansion data, the execution speed of the extract instruction may be delayed because the process is dependent in nature.

Moreover, the position of a boundary bit where the logical value of the mask data varies has to be found out in order to designate the sign bit to be expanded in a sign expansion circuit on the basis of mask data. Nevertheless, a number of logic circuits such as inverters for converting an input into a complementary level will become necessary if the logic of decoding input data at the complementary level is adopted. This also apparently results in increasing the chip area.

An object of the present invention is to provide an arithmetic unit such that the percentage of the area of the arithmetic unit for effecting the extraction and the replacement of an optional area of data on a chip is reducible.

Another object of the present invention is to increase the speed of bit field operations for effecting the extraction and the replacement of an optional area of data.

A further object of the present invention is to provide a decoder which contributes to decreasing the area occupied by a chip.

A still further object of the present invention is to provide a barrel shifter circuit whose operating speed can be increased and/or which is made smaller in size.

The foregoing and other objects and novel features of the invention will be apparent from the following description taken in connection with the accompanying drawings.

A brief description will subsequently be given of an exemplary invention as disclosed herein.

In a bit field operational arithmetic unit including extracting or replacing an optional area of data, a first barrel shifter for subjecting input data to optional bit shifting and a second barrel shifter designed for the shift amount to be controlled equally are adopted in a mask data generating circuit. The mask data generating circuit is provided with a mask bit generating circuit for generating second mask data on the basis of data for designating the width of an area in a bit string. The second barrel shifter generates first mask data on receiving the output of the mask bit generating circuit. The first mask data is utilized as a selection signal of a selection means for selecting bitwise either the output of the first barrel shifter or other data received and outputting the selected one, whereas the second mask data is utilized for subjecting the data output from the first barrel shifter to sign expansion or as data for designating an expansion area for the expansion circuit effecting expansion at a predetermined logical value.

In order to restrain an increase in chip area resulting from the provision of the first and second barrel shifters, an area where a transistor train is formed in the first barrel shifter and another where a transistor train is formed in the second barrel shifter are provided in parallel to each other in an area having the same width as what is occupied by a 1-bit memory cell of a storage means on the chip such as a register file for temporarily holding operational data and shift amount control lines for common use are provided for both barrel shifters.

In the expansion circuit, a logic gate circuit as a specific circuit for comparing adjoining 2-bit logical values of the second mask data and outputting the boundary bit whose logical value is varied in the bit string of the second mask data at a logical value different from those of other bits is employed so as to restrain an increase in bit area resulting from providing the specific circuit for designating the position of the signal bit to be expanded on the basis of the second mask data. The logic gate circuit may be provided with a plurality of exclusive-OR circuits. Such a logic gate circuit as this can also be utilized as another decode logic circuit and by processing the output of a means for developing n-bit data into 2 squared bit data in the logic gate circuit, decoding logic for the n-bit data can be established.

In the process of extracting an optional area of data under the extract instruction, there is provided a sign expansion circuit capable, on receiving the input data of the first barrel shifter, of subjecting all bits to sign expansion based on the predetermined bit of that data, for instance, No. 0 bit and producing the result as the other data of the selection means.

When the bit field operations for extracting and outputting an optional area of the input data using the arithmetic unit employing such a sign expansion circuit, the process of shifting the input data by means of the first barrel shifter and that of subjecting all bits of the input data to sign expansion by means of the sign expansion circuit are paralleled to shorten the processing time required to implement both processes. The results obtained from both processes are input to the selection means to effect selection with the first mask data and data including the area to be extracted from the input data and No. 0 bit is generated.

The arithmetic unit is capable of performing a process of replacing an optional area of different data with the predetermined area of the input data. This process includes a process of shifting by predetermined bits the replacement area of the input data up to a replacement position, a process of generating the first mask data for designating the replacement area of the data thus shifted by means of the second barrel shifter, and a process of selecting the output data of the first barrel shifter and different data on the basis of the first mask data.

With the above-mentioned means, the barrel shifters for shifting the input data and generating the mask data are respectively employed in the bit field operational arithmetic unit. Moreover, the shift amount of one barrel shifter and that of the other are equalized, whereby the bit field operation of extracting an optional of data and replacing an optional area of data is relatively simplified. Therefore, it is possible to increase the speed and functional level of the process as will be described later.

The area occupied by the chip of the bit field operational arithmetic unit is reduced by laying out the two sets of barrel shifters in such a way as to set those stacked to the width of 1-bit memory cell of the register file.

The operating speed at the time the optional area of data is extracted can be increased by paralleling the sign expansion to which the input data is subjected and data shifting in terms of time.

As it is unnecessary to convert the input data into a signal at the complementary level by obtaining decoded results using the mask bit, the circuit scale or the area occupied by the chip is reduced.

DESCRIPTION OF THE PREFERRED EMBODIMENTS

A description will successively be given of a bit field operational arithmetic unit and the operating method thereof according to the present invention.

[1] Processor.

Figure 1:
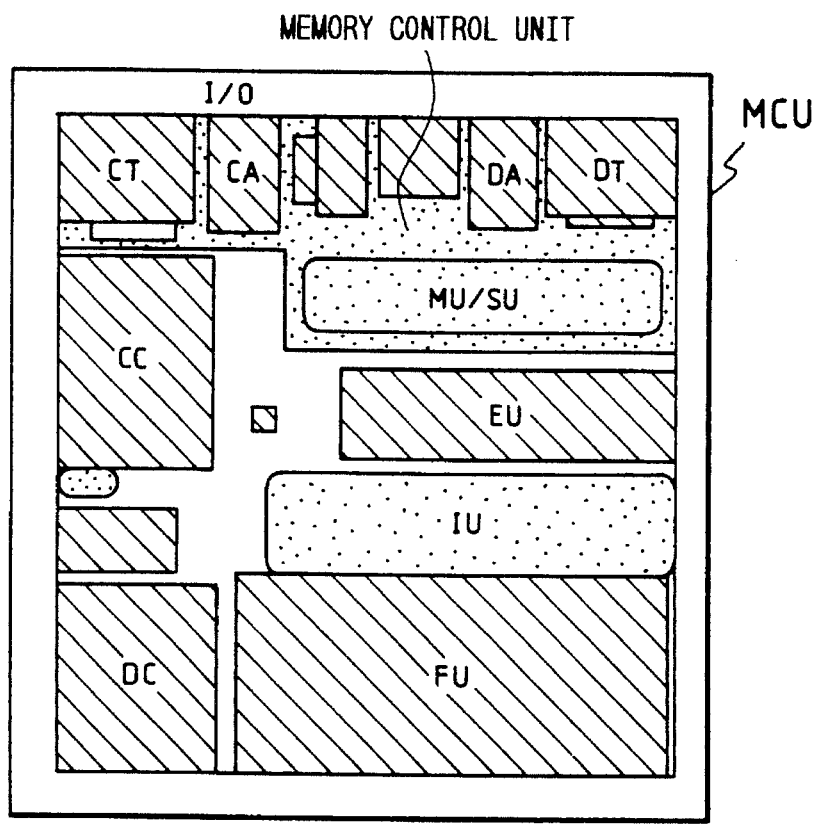
FIG. 1 is a top view of a chip of a processor embodying the present invention.

FIG. 1 illustrates a microprocessor embodying the present invention. A microprocessor MCU shown in FIG. 1 comprises, though not necessarily limited to the following, an instruction cache memory CC, a data cache memory DC, an integer arithmetic unit EU, a floating-point arithmetic unit FU, an instruction control random logic unit IU, a memory control random logic unit MU, a secondary cache control random logic unit SU, instruction tag cache memory CA, a data tag cache memory DA, an instruction address conversion buffer CT, a data address conversion buffer DT, an input/output unit I/O and the like. In this case, any known semiconductor integrated circuit manufacturing technology may be used for installing these components in one semiconductor substrate. This microprocessor MCU has an architecture of RISC (Reduced Instruction Set Computer) type, though not restricted to this. The RISC architecture is well known and used to increase processing speed while simplifying the instruction set and it is possible to implement instruction decoding only by means of hard wired logic like random logic without using control storage, for instance.

Figure 2:
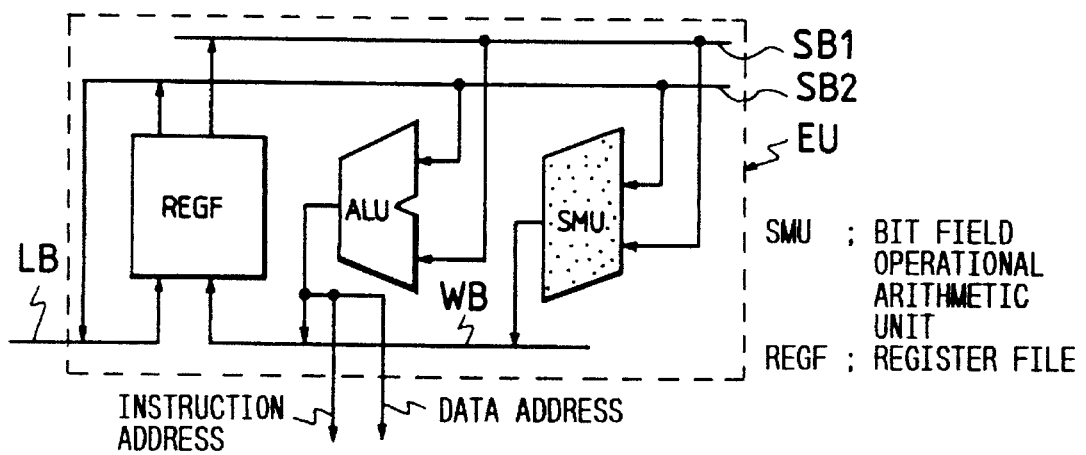
FIG. 2 is a block diagram of an exemplary integer arithmetic unit.

FIG. 2 illustrates an exemplary integer arithmetic unit EU. The integer arithmetic unit EU is controlled by the result read from the instruction cache memory CC and decoded in the instruction random logic unit IU and has two arithmetic units: an arithmetic and logic unit ALU and a bit field operational arithmetic unit SMU, either unit being operated according to a control signal from the instruction control random logic unit IU. Operations are performed on the data hole a register file REGF included in the integer arithmetic unit EU. The data read from the register file REGF is passed through source buses SB1, SB2 in the integer arithmetic unit EU and supplied to the arithmetic and logic unit ALU and the bit field operational arithmetic unit SMU. The arithmetic and logic unit ALU and the bit field operational arithmetic unit SMU that have received the data perform predetermined operations and write the results of operations back to the register file REGF again via a bus WB. Data transfer the integer arithmetic unit EU and any other unit is carried out via a load bus LB. The arithmetic and logic unit ALU performs the calculation of addresses such as a memory access address when register-to-register arithmetic/logical operations and LOAD/STORE instructions are executed and a branch address under a branch instruction. The bit field operational arithmetic unit SMU is designed to extract an optional area of data and to replace an optional area of data which are nonexistent in other RISC processors and what embodies the present invention.

Figure 16:
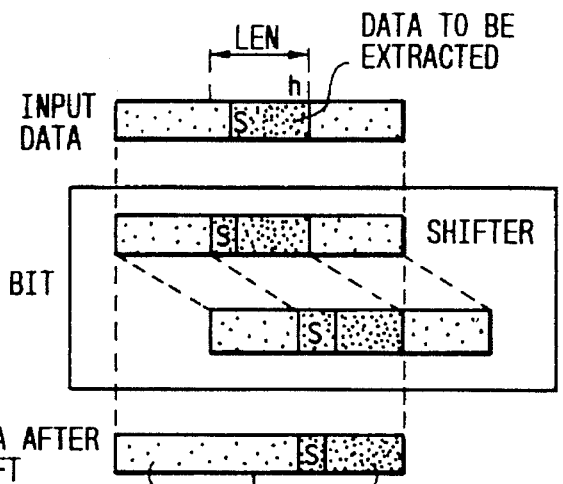
FIG. 16 is a diagram illustrating the basic operation of the extract instruction.
Figure 16:
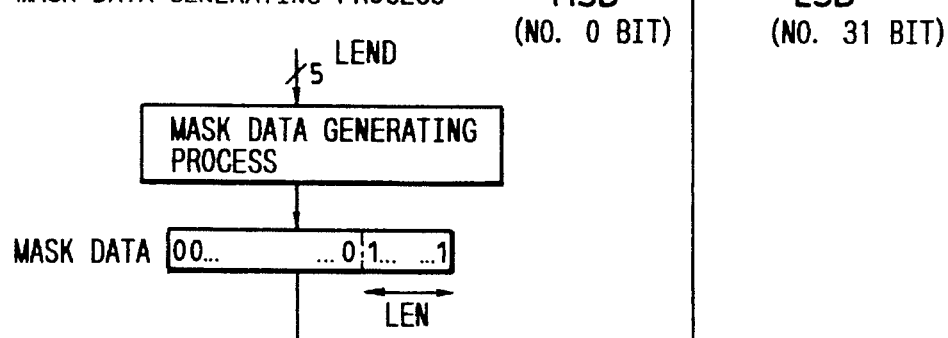
Figure 16:
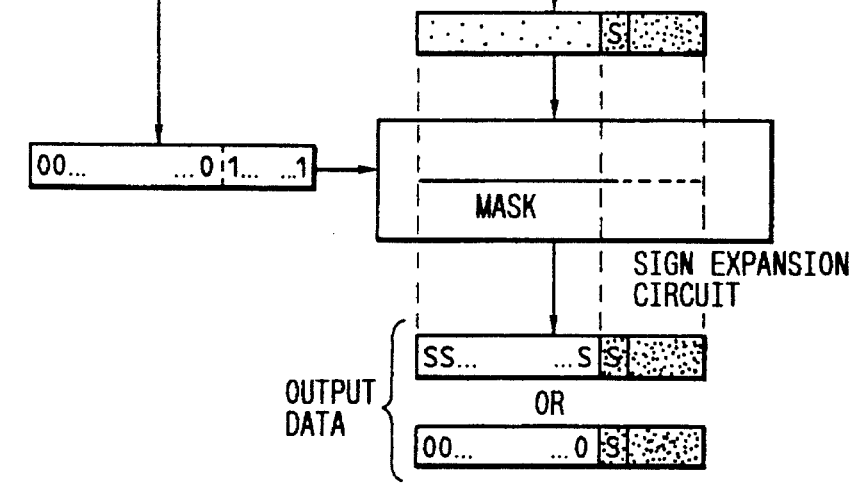
Figure 17:
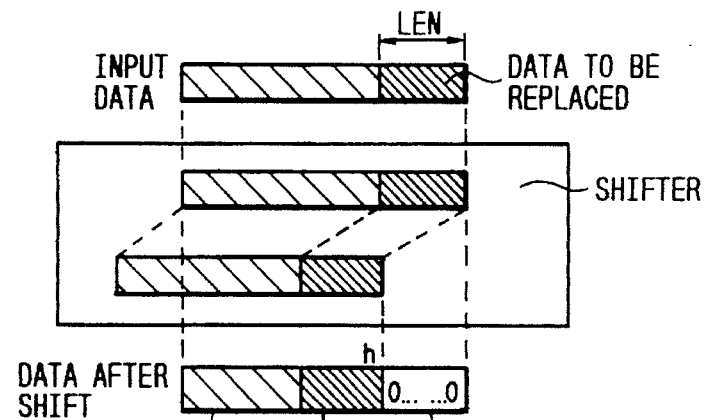
FIG. 17 is a diagram illustrating the basic operation of a deposit instruction.
Figure 17:
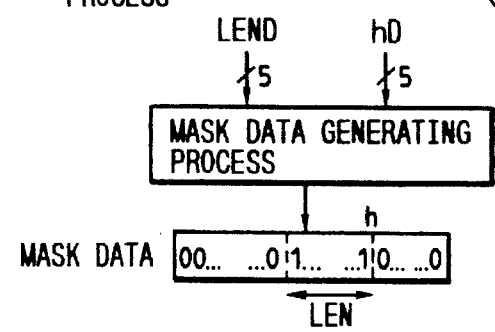
Figure 17:
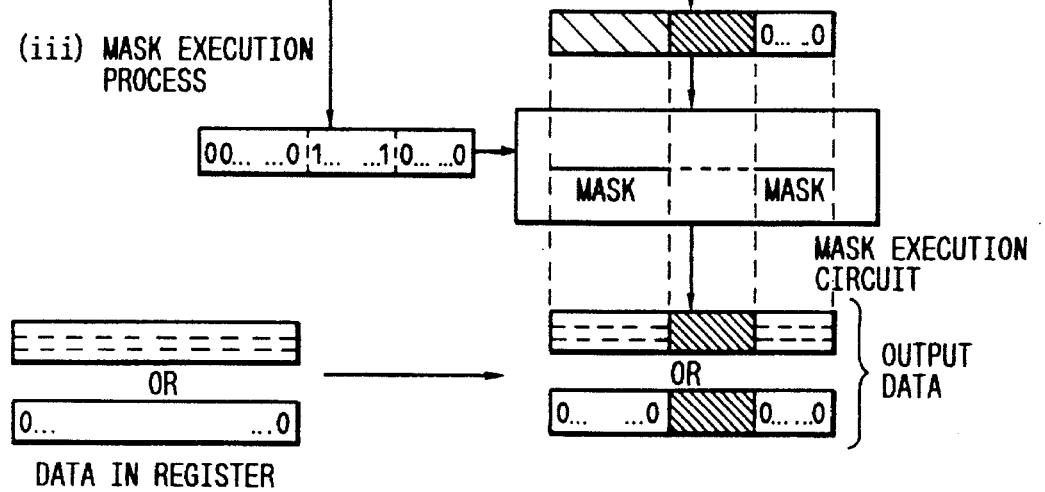

Instructions to be executed by the bit field operational arithmetic unit SMU are broadly classified into:

(1) shift instruction;

(2) extract instruction (extraction of an optional area of data); and (3) deposit instruction (replacement of an optional area of data). Each of the instructions is executed in one cycle. FIG. 16 illustrates the basic operations under the extract instruction, whereas FIG. 17 illustrates the basic operations under the deposit instruction. These instructions are for special operations nonexistent in other RISC processors. Although similar functions exist in CISC processors, the operations require several ten cycles under microprogram control (what employs the above-mentioned control storage). The extract instruction is intended to shift an optional area of data to the rightmost end while filling the remaining area with 0 or sign bits. The optional area of data to be extracted is designated by area width LEN and a bit position h at the rightmost end of the area. The deposit instruction is designed for operations opposite to those under the extract instruction and intended to write the area designated by width LEN at the rightmost end of data to an optional area of different data. The data written as a base at this time is, though not restricted to the following, the data supplied from the register file REGF or what has all bits set to logic 0.

Figure 19:
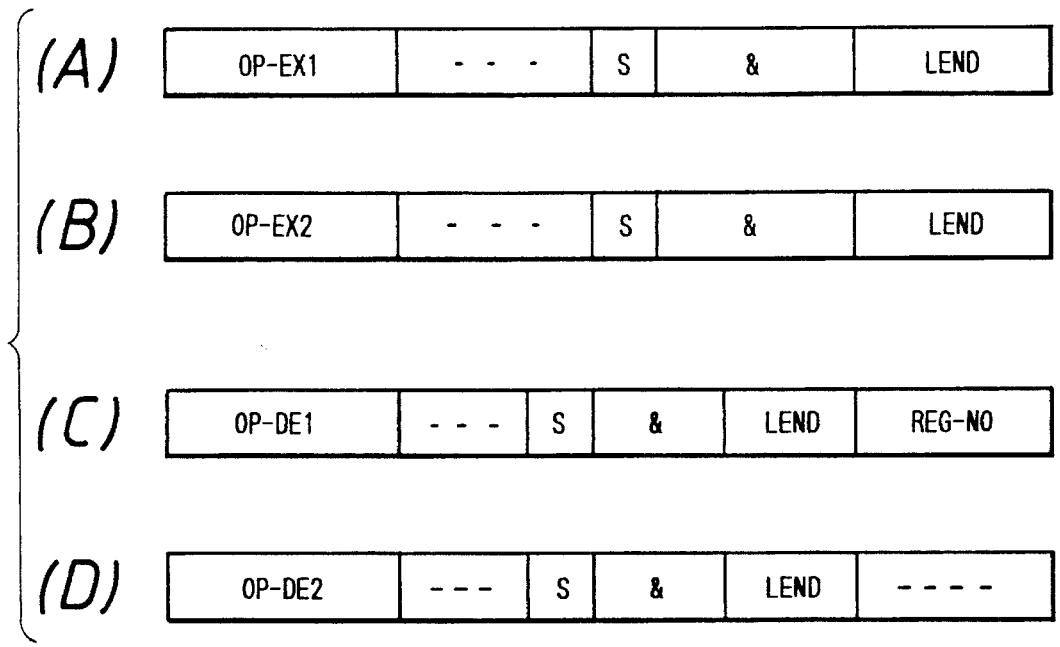
FIG. 19 is a diagram illustrating formats of the extract and deposit instructions.

FIGS. 19(A), (B) illustrate extract instruction formats and an operation code determines whether to fill the remaining area with "0" or sign bits. Consequently, there are two kinds of extract instructions. For instance, the extract instruction shown in FIG. 19(A) has an operation code OP-EX1 for causing the remaining area to be filled with "0," whereas the extract instruction shown in FIG. 19(B) has an operation code OP-EX2 for causing the remaining area to be filled with sign bits. In this embodiment, the bit position h is determined by the data & included in the extract instruction or what is held in a control register for shift amount (though not shown, included in the instruction control random logic unit IU). In this case, the value of a control field S in the extract instruction determines whether to use the data (coded data) held in the control register or the data (coded data) held in the field & of the instruction. If "1" is set in the control field S, for instance, the value of the field & in the instruction is used data representing the bit position h, whereas if "0" is set therein, a value in the control register for shift amount is used what represents the bit position h. A field LEND in the extract instruction is what holds data (coded data) representing the area width LEN.

FIGS. 19(C), (D) illustrate extract instruction formats and there are also provided two kinds of deposit instructions. For instance, the deposit instruction shown in FIG. 19(c) has an operation code OP-DE1 meaning the use of the data held in the register in the register file REGF as what is written as the base date. On the other hand, the deposit instruction shown in FIG. 19(D) has an operation code OP-DE2 meaning the use of "0" as what is written as the base data. In the case of the deposit instruction shown in FIG. 19(C), it is necessary to designate the register holding the base data. Consequently, the deposit instruction of FIG. 19(C) has a field holding data REG-No for designating the register number. Further, the fields LEND, S, & shown in FIG. 19(C), (D) are similar to those of the above-mentioned extract instruction.

Figure 3:
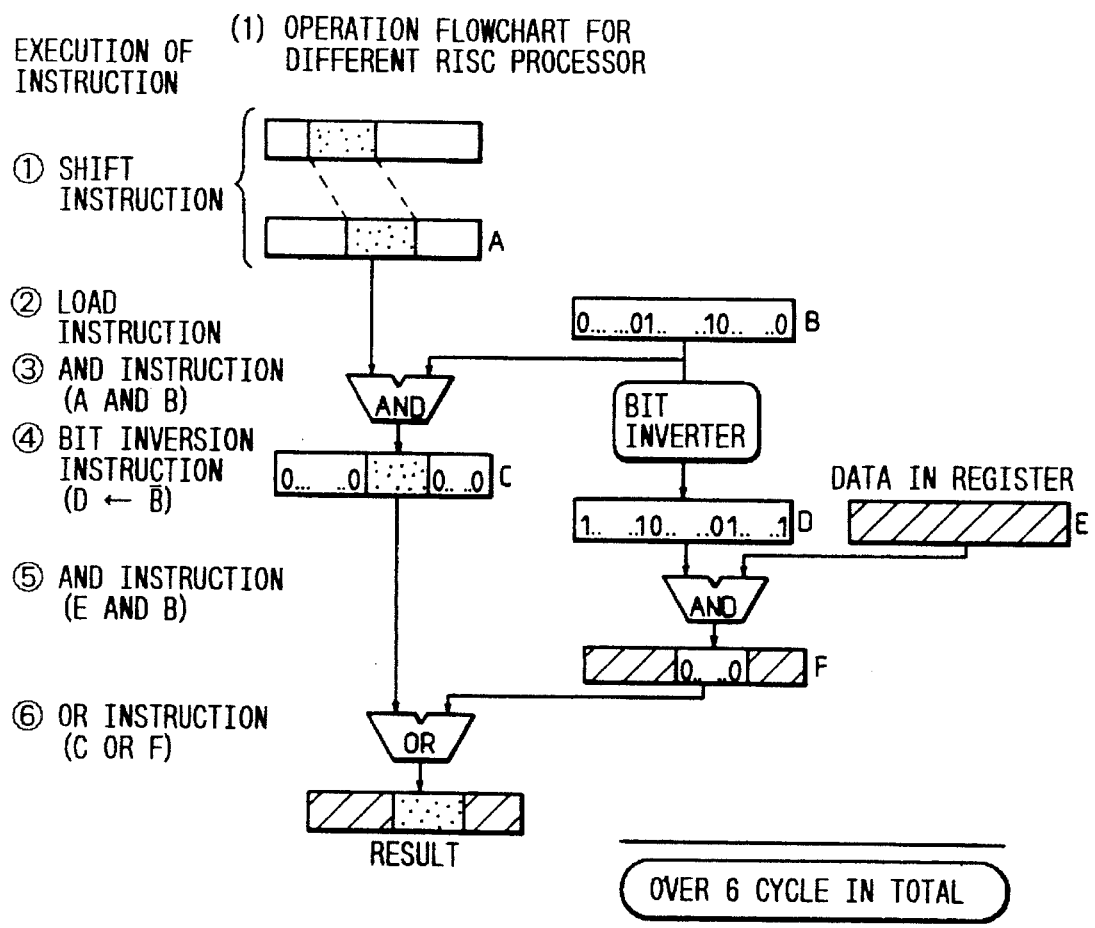
FIG. 3 is a diagram illustrating instruction steps of performing the operation of replacing an optional area of data with that of different data when a bit field operational arithmetic unit according to the present invention is employed in comparison with a case where it is not used.
Figure 3:
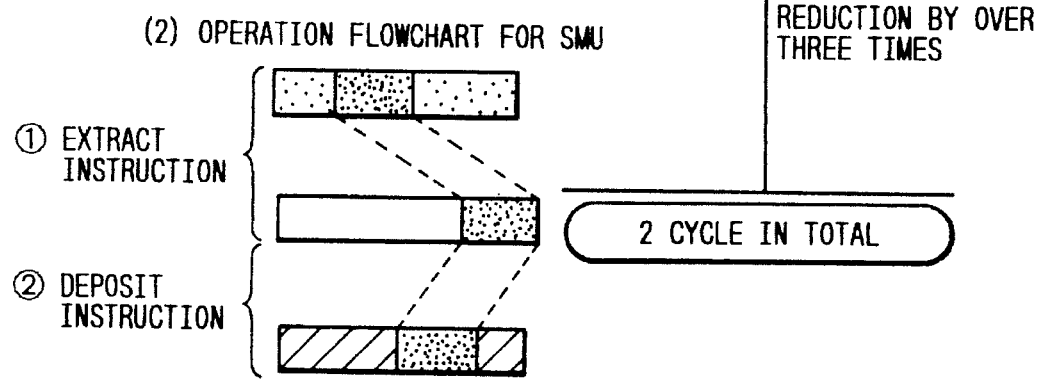

The operation of replacing an optional area of data with an optional area of different data is often utilized in graphic processing and when the bit field operational arithmetic unit SMU according to the present invention is not employed for the operation, that is, when a different RISC processor is used, the following six instructions shown in FIG. 3 will have to be executed.

(1) Shift instruction: to shift an area to be replaced up to a position (a desired position) where the replacement takes place;

(2) LOAD instruction: to read mask data setting 1 at a bit corresponding to the bit of an area to be replaced;

(3) AND instruction: to AND the shifted data with mask data;

(4) Bit inversion instruction: to prepare bit inverted data of mask data;

(5) AND instruction: to AND the bit inverted data with the base data; and (6) OR instruction: to OR the data prepared in (3) and what has been prepared in (5).

On the contrary, similar operations are completed in the two cycles of the extract and deposit instructions in the bit field operational arithmetic unit SMU of this embodiment. Processing time is thus shortened over three times and this make it possible high-speed graphic processing.

Figure 4:
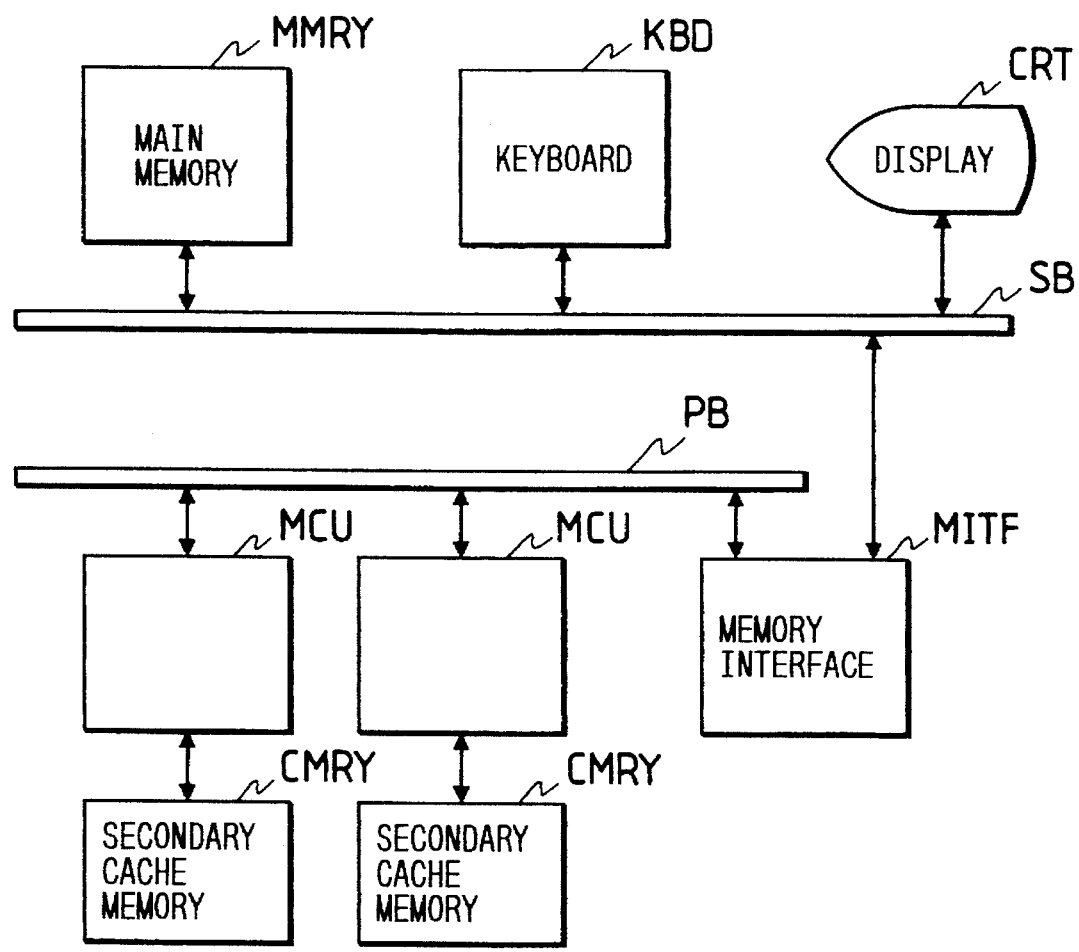
FIG. 4 is a block diagram of an exemplary graphic processing system using the processor.

FIG. 4 illustrates an exemplary graphic processing system using the microprocessor MCU. A display CRT, a keyboard KBD, a main storage MMRY and the like are connected to a system bus SB, these being further connected to a peripheral bus PB via a memory interface MITF like a common memory having a dual port. Microprocessors MCU are connected to the peripheral bus PB and a secondary cache memory CMRY is coupled to each of them.

[2] Bit field operational arithmetic unit.

Figure 5:
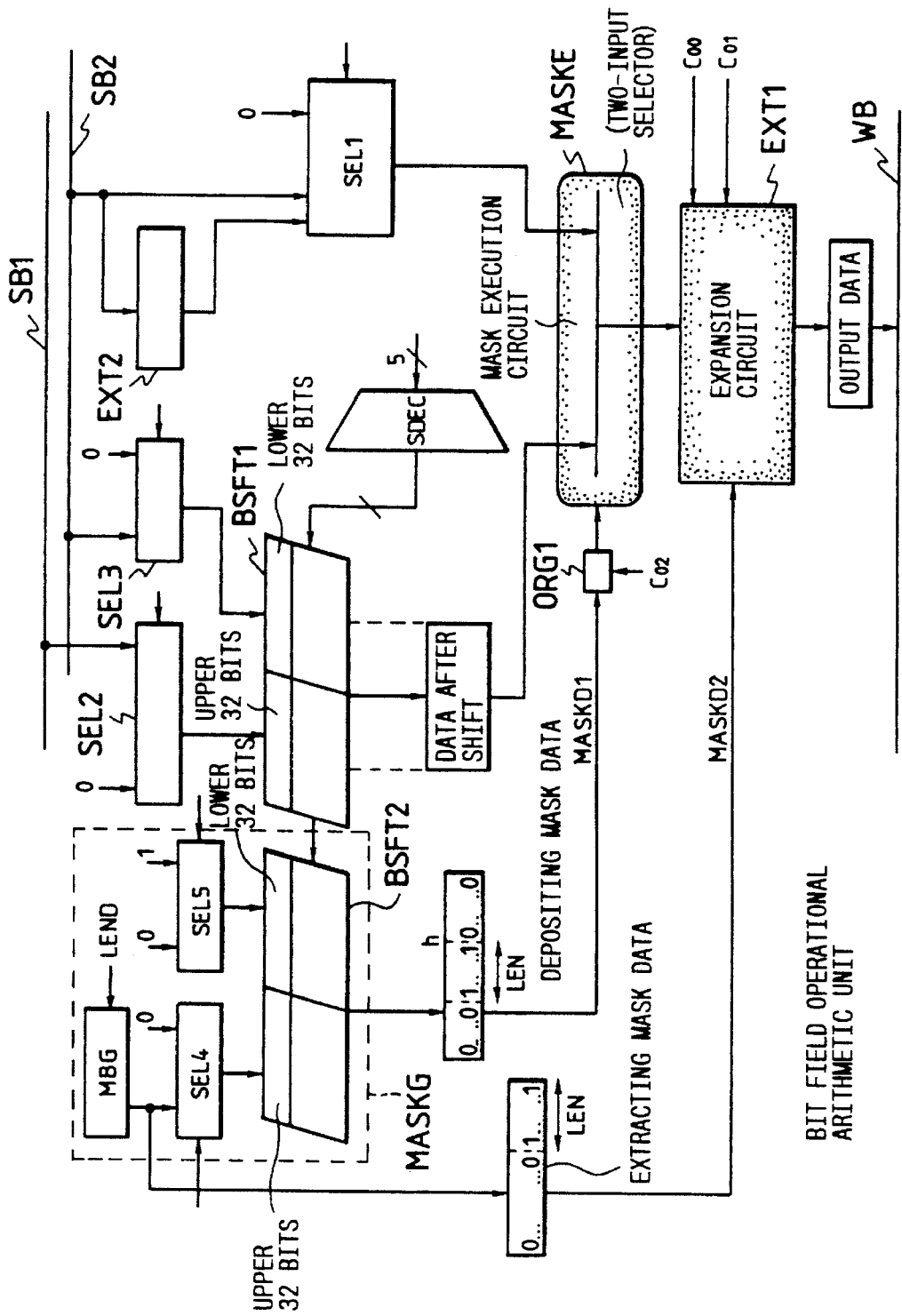
FIG. 5 is a block diagram of a bit field operational arithmetic unit embodying the present invention.

FIG. 5 illustrates a bit field operational arithmetic unit embodying the present invention.

The bit field operational arithmetic unit SMU mainly comprises a first barrel shifter BSFT1 for shifting input data, a mask data generating circuit MASKG, a mask execution circuit MASKE, an expansion circuit EXT1, and a No. 0 bit sign expansion circuit EXT2. The first barrel shifter BSFT1 is used to shift an optional bit of data and on receiving 1-word data (one word having 32 bits) from each of the selectors SEL2, SEL3, it simultaneously shifts a total of two words in order to output one word data. As is obvious from FIGS. 6 and 8, each bit position of the word thus output corresponds to that of a word in high order. This is also the case with the barrel shifter BSFT2. The shift amount is determined by the output of a decoder SDEC. The first barrel shifter BSFT1 is also used for an ordinary shift instruction in addition to the extract and deposit instructions. Any other RISC processor is often provided with such a barrel shifter as a bit field operational arithmetic unit.

The mask execution circuit MASKE operates to execute the mask with first mask data MASKD1 generated in the mask data generating circuit MASKG as a basis. This circuit functions as a two-input selector for receiving 1-word data at each of its inputs and outputting data of one word in total by selecting bit by bit the data output from the first barrel shifter BSFT1 and what is supplied from the selector SEL1.

The expansion circuit EXT1 subjects the data output from the mask execution circuit MSKE to 0 expansion (logic 0 expansion) or sign expansion based on the second mask data MASKD2 generated in the mask data generating circuit MASKG when the extract instruction is executed. In this case, the expansion circuit EXT1 outputs the data output from the mask execution circuit MASKE as it is when the deposit instruction is executed.

The 0 bit sign expansion circuit EXT2 subjects all bits of the input data involved to sign expansion with No. 0 bit value of the input data and supplied the result to the selector SEL1.

The configuration of the No. 0 bit sign expansion circuit can readily be attained by using part of a circuit of FIG. 20 as will be described later.

TABLE

| Selector & Control Signal | INSTRUCTION | | | | |
|---|---|---|---|---|---|
| | DEPOSIT INSTRUCTION | | EXTRACT INSTRUCTION | | OTHER SIFT INSTRUCTION |
| | A | B | C | D | |
| SEL 1 | DATA "0" | SB2 | DATA "0" | EXT2 | — |
| SEL 2 | SB1 | | DATA "0" | | SB1 |
| SEL 3 | — | | SB2 | | SB2 (64 BIT) DATA "0" (32 BIT) |
| SEL 4 | MBG | | DATA "0" | | DATA "0" |
| SEL 5 | DATA "0" | | DATA "1" | | DATA "1" |
| Coo | 1 AT:1 | | 0 AT:2 | | 1 AT:1 |

TABLE-continued

| Selector & Control Signal | INSTRUCTION | | | | |
|---|---|---|---|---|---|
| | DEPOSIT INSTRUCTION | | EXTRACT INSTRUCTION | | OTHER SIFT INSTRUCTION |
| | A | B | C | D | |
| $Co_1$ | — | — | DATA "0" | SIN-BIT | — |
| $Co_2$ | 0 | 0 | 0 | 0 | 1 |
| | AT:3 | AT:3 | AT:3 | AT:3 | AT:4 |

Note:
AT:1 = Selecting the output of MASKE.
AT:2 = Selecting ones of the output of SEL6 and the output of MASKE in accordance with MASKD2.
AT:3 = Selecting ones of the output of SEL1 and the shifted data in accordance with MASKD1.
AT:4 = Selecting the shifted data.

Each of the selectors SEL1–SEL5 shown in FIG. 5 is controlled by the control signal formed by the instruction control random logic unit IU. The instruction control random logic unit IU forms the control signal mainly based on the operation code of the instruction (deposit instruction, extract instruction, shift instruction) supplied thereto.

Table shows the relation between the instruction and each state of the selector SEL1–SEL5 and also control signals Coo, $Co_1$, $Co_2$ formed by the instructions. The column A in the table refers to a case where data "0" is to be used as the base data under the deposit instruction, the column B to a case where the data held by the register is to be used as the base data under the deposit instruction, the column C to a case where the remaining area is filled with "0" under the extract instruction, and the column D to a case where the remaining area is filled with sign data under the extract instruction. Moreover, "-" represents any given state.

A description will subsequently be given of how the selector SEL1–SEL5 and control signals Coo, $Co_1$, $Co_2$ are adapted when the instruction is supplied.

When the deposit instruction is supplied to the unit IU, the selector SEL2 selects and outputs data on the bus SB1. At this time, the selector SEL4 selects the output of MBG, whereas the selector SEL5 selects and outputs the data "0." The selector SEL1 selects data "0" when instructed to use the data "0" as base data (column A) and data on the bus SB2 when instructed to use the data held by the register as base data (column B) and outputs the outcome. In the case of the deposit instruction, moreover, , "1", "0" are output as the control signals $Co_1$, $Co_2$. When it is instructed to use the data held by the register as the base data, the register designated by the register number REG-No under the deposit instruction is selected and the data held is supplied to the bus SB2. When the data in the register is instructed to use as the base data, the data held by the register designated by the register number REG-No is output from the selector SEL1.

When the extract instruction is supplied to the unit IU, the selector SEL2 selects and outputs data "0." The selectors SEL3, SEL4 and SEL5 select and output data on the bus SB2, data "0" and data "1," respectively. When it is instructed to fill the remaining area with data "0," the selector SEL1 selects data "0" and when it is instructed to fill the remaining area with signs, it selects and outputs the output of the expansion circuit EXT2. Moreover, the control signals $Co_1$, $Co_2$ simultaneously become "0." The control signal $Co_1$ is made a signal for selecting data "0" when "0" is used as will be described later and it is made a signal for selecting SIN-BIN when signs are used for filling purposes.

When the shift instruction is supplied to the unit IU, the selectors SEL2, SEL4 and SEL5 select and output data on the bus SB1, data "0" and data "1," respectively. When the selector SEL3 performs the shift operation with respect to 64-bit data, it selects and outputs data on the data bus SB2 and otherwise selects and outputs data "0" when it performs the shift operation with respect to 32-bit data. At this time, the control signals $Co_1$, $Co_2$ simultaneously become "1."

The value of the field LEND representing the area width LEN included in the instruction is supplied from the instruction control random logic unit IU to the mask bit generating circuit MGB and so to the decoder SDEC therefrom, the field & representing the shift amount or the value held by the control register for shift amount.

The control signals $Co_2$ is supplied to one input terminal of an OR gate ORG1 and mask data MASKD1 to the other input terminal thereof. The control signals $Co_1$, $Co_2$ are supplied to the expansion circuit EXT1. FIG. 20 illustrates an exemplary expansion circuit EXT1.

Figure 20:
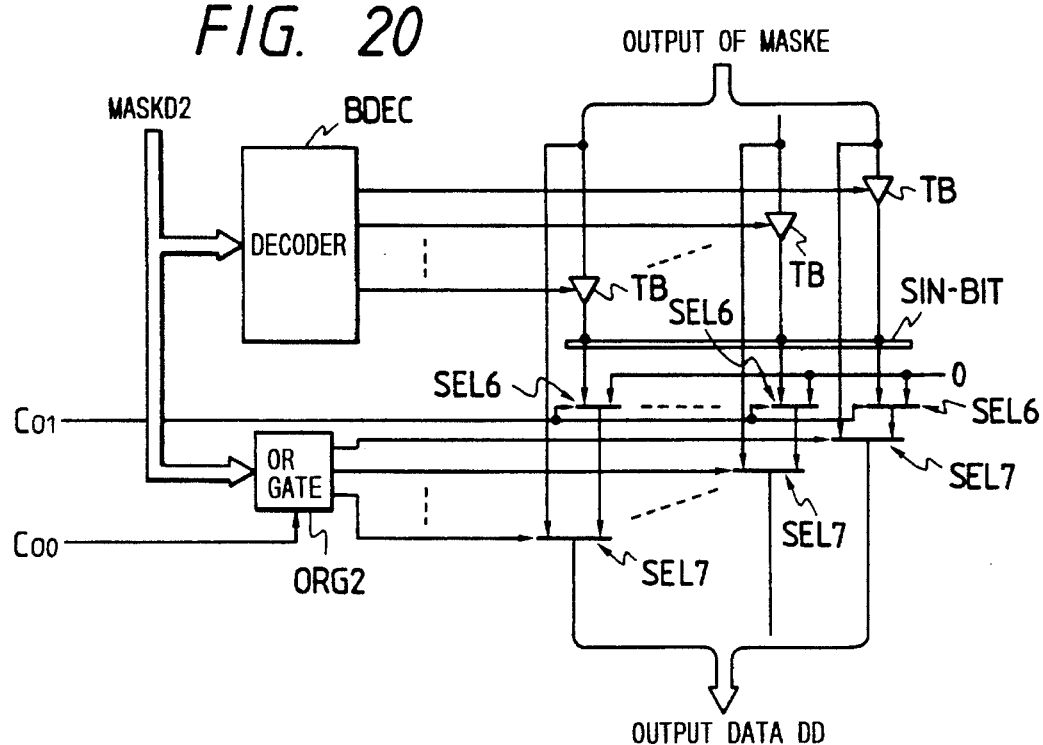
FIG. 20 block diagram illustrating an exemplary expansion circuit of FIG. 5.

The expansion circuit EXT1 shown in FIG. 20 comprises a decoder BDEC, an OR gate ORG2, tri-state buffers TB, a sign line SIN-BIT, and selectors SEL6, SEL7.

Figure 15:
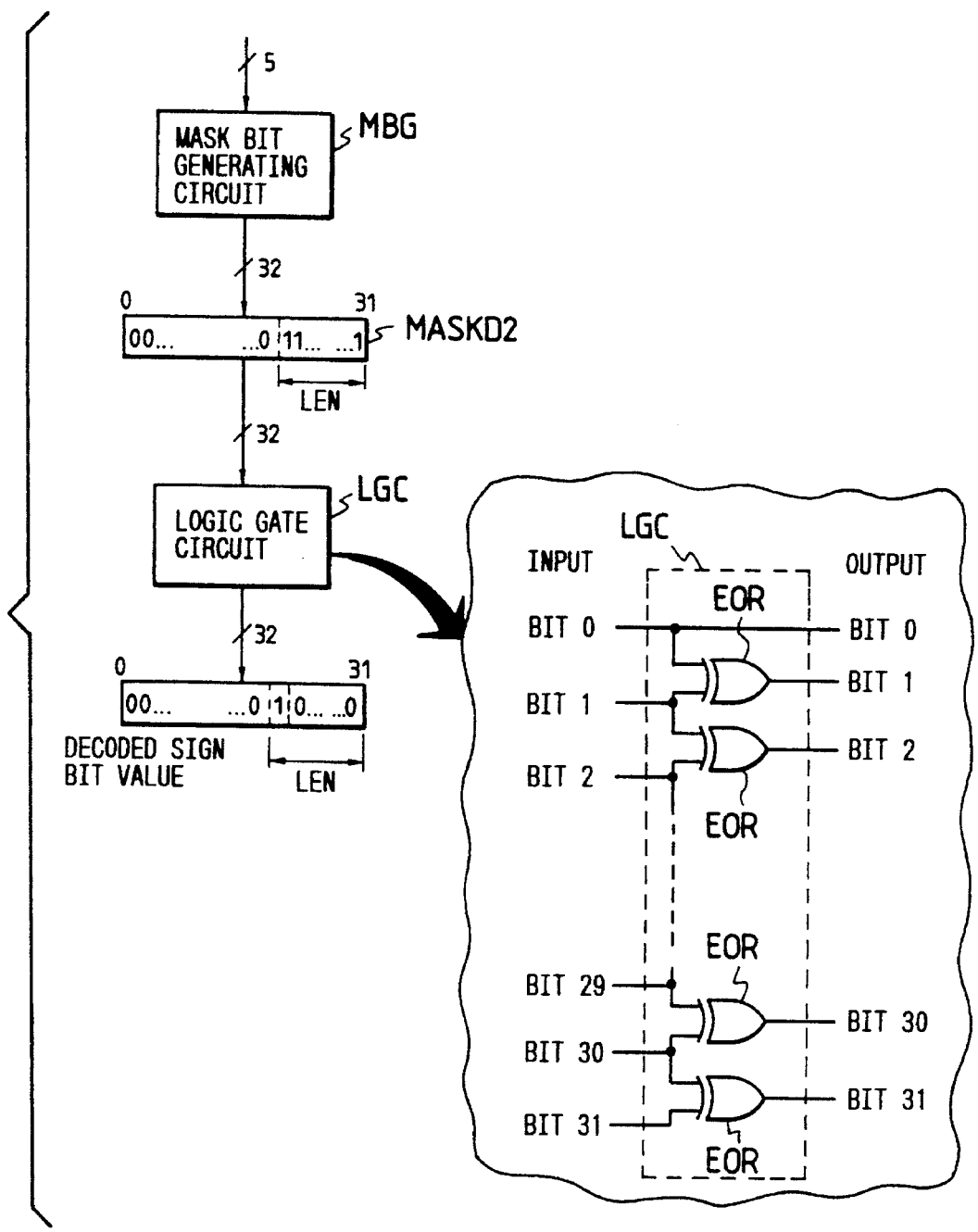
FIG. 15 is a block diagram illustrating an exemplary decoder for extracting the position of a sign bit for subjecting the data output from a mask execution circuit to sign expansion.

Mask data MASKD2 is supplied to the decoder BDEC, which decides a boundary bit where a logical value varies in the mask data MASKD2 and makes the corresponding bit "1," for instance, and the remaining bit "0." FIG. 15 illustrates an exemplary decoder BDEC as will be described later. The output of the mask execution circuit MASKE is supplied to the tri-state buffer TB. The control of these tri-state buffers TB is exerted by the output of the decoder BDEC and the outputs of these tri-state buffers are adapted for common use and supplied to the sign line SIN-BIT. In this way, the tri-state buffers TB transmit the bit in the output data of the mask execution circuit MASKE corresponding to the boundary bit whose logical value varies in the output data of the mask data MASKE. The selector SEL6 selects and outputs the value on the sign line SIN-BIT or data "0" according to the control signals $Co_1$. The OR gate ORG2 receives the control signal Coo and the mask data MASKD2 as inputs to form a signal for controlling the selector SEL7. The selector SEL7 selects and outputs the output of the selector SEL6 or the mask execution circuit MASKE.

When the control signal Coo changes to "1," the OR gate ROG2 outputs "1," irrespective of the value of the mask data MASKD2. Consequently, the selector SEL7 selects and outputs the output of the mask execution circuit MASKE. While the control signal Coo remains at "0," the bit at the output of the mask execution circuit MASKE corresponding to the bit at "1" in the mask data MASKD1 is output from the selector SEL7, which functions in such a way as to apply the output of the selector SEL6 to the bit in the output data DA corresponding to the bit at "0" in the mask data MASKD2.

While the control signals $Co_2$ remains at "1," data "1" is supplied from the OR gate ORG1 to the mask execution circuit MASKE, whereas when the control signals $Co_2$ remains at "0," the data in accordance with the mask data MASKD1 is supplied from the OR gate ORG1 to the mask execution circuit MASKE.

The control signals $Co_1$ becomes, in the case of sign expansion, "1," for instance. The selector SEL6 selects the data on the sign line SIV-BIT in response thereto accordingly. A common value is output from the selector SEL6 thereby. On the contrary, that is, when the remaining area is filled with data "0," the control signals $Co_1$ becomes "0." The selector SEL6 thus selects and outputs data "0."

The expansion circuit EXT1, the No. 0 bit sign expansion circuit EXT2, the mask bit generating circuit MASKG and the mask execution circuit MASKE are discrete circuits needed for the execution of the extract and deposit instructions as the discrete processes in the bit field operational arithmetic unit SMU and nonexistent in other RISC processors. It is therefore necessary to reduce the area occupied by those circuits and to minimize an operational delay in order to materialize the performance superior to that of any other RISC processor. This aim has been attained in this embodiment and a detailed description will subsequently be given of the accomplishment.

[3] Mask data generating circuit with the barrel shifter.

Figure 6:
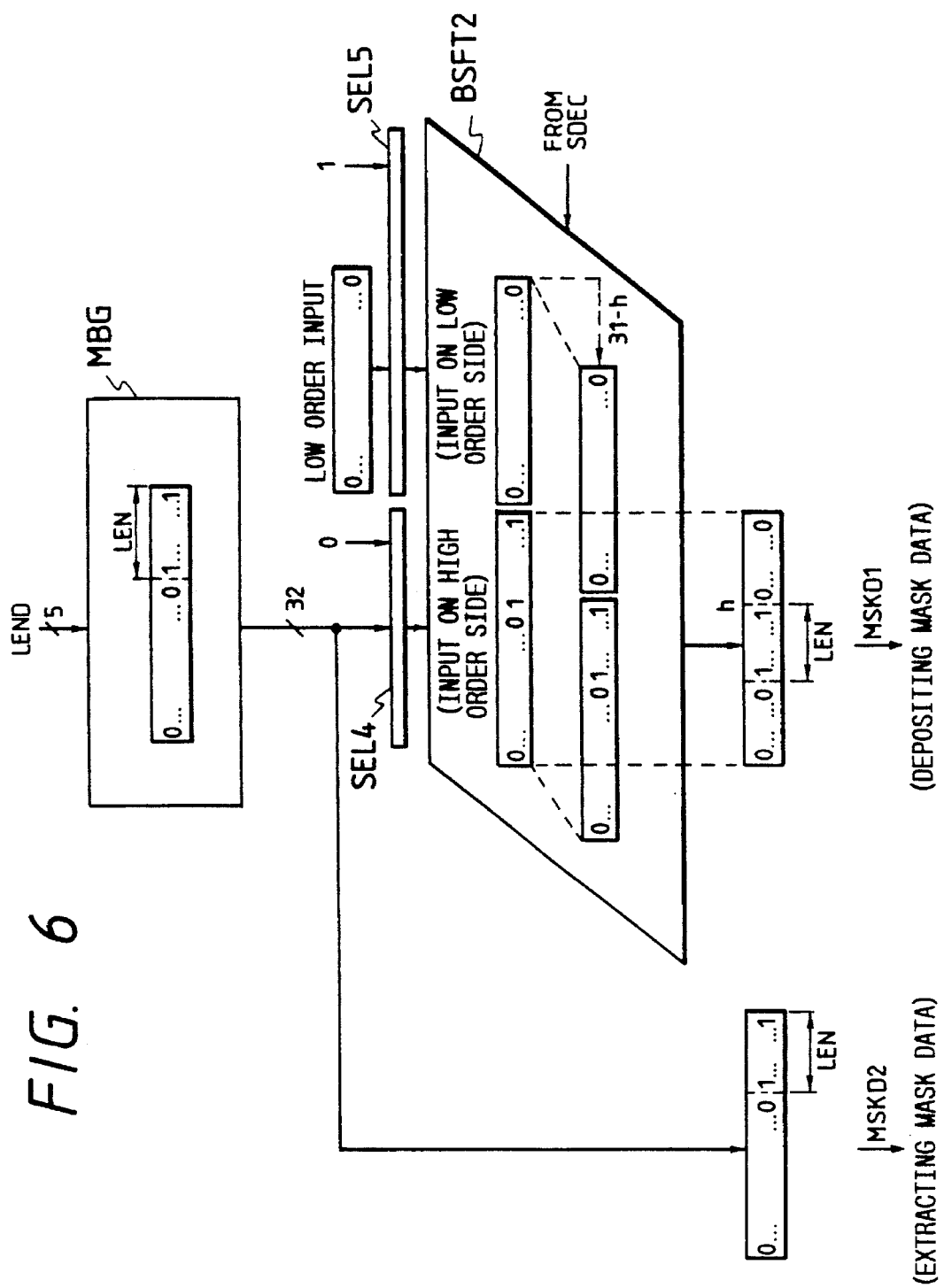
FIG. 6 is a diagram illustrating an exemplary mask data generating circuit.

The mask data generating circuit MASKG has, as shown in FIG. 6, a mask bit generating circuit MBG, and the selectors SEL4, SEL5. The mask bit generating circuit MBG generates the second mask data MASKD2 indicative of the bit width (area width) LEN of logic 1 from the rightmost end of the 32-bit string with the 5-bit value on receiving the 5-bit data LEND included in the instruction, though not restricted to this process. The logic of generating the second mask data MASKD2 may simply be configured with hard wired logic. The second barrel shifter BSFT2, like the first barrel shifter BSFT1, is used to shift an optional bit of data by receiving 1-word data and simultaneously shifting two words in total to output one word data having a bit position corresponding to the bit position in the upper side input word at 1 to 1 ratio. The shift amount is determined by the output of the decoder SDEC. The second mask data MASKD2 or what makes all bits logic 0 is supplied via the selector SEL4 to the upper side input of the second barrel shifter BSFT2. On the other hand, data whose 32 bits are totally logic 0 or 1 is supplied via the selector SEL5 to the lower side input of the second barrel shifter BSFT2. The output shifted by the second barrel shifter BSFT2 is made the first mask data MASKD1.

Figure 18:
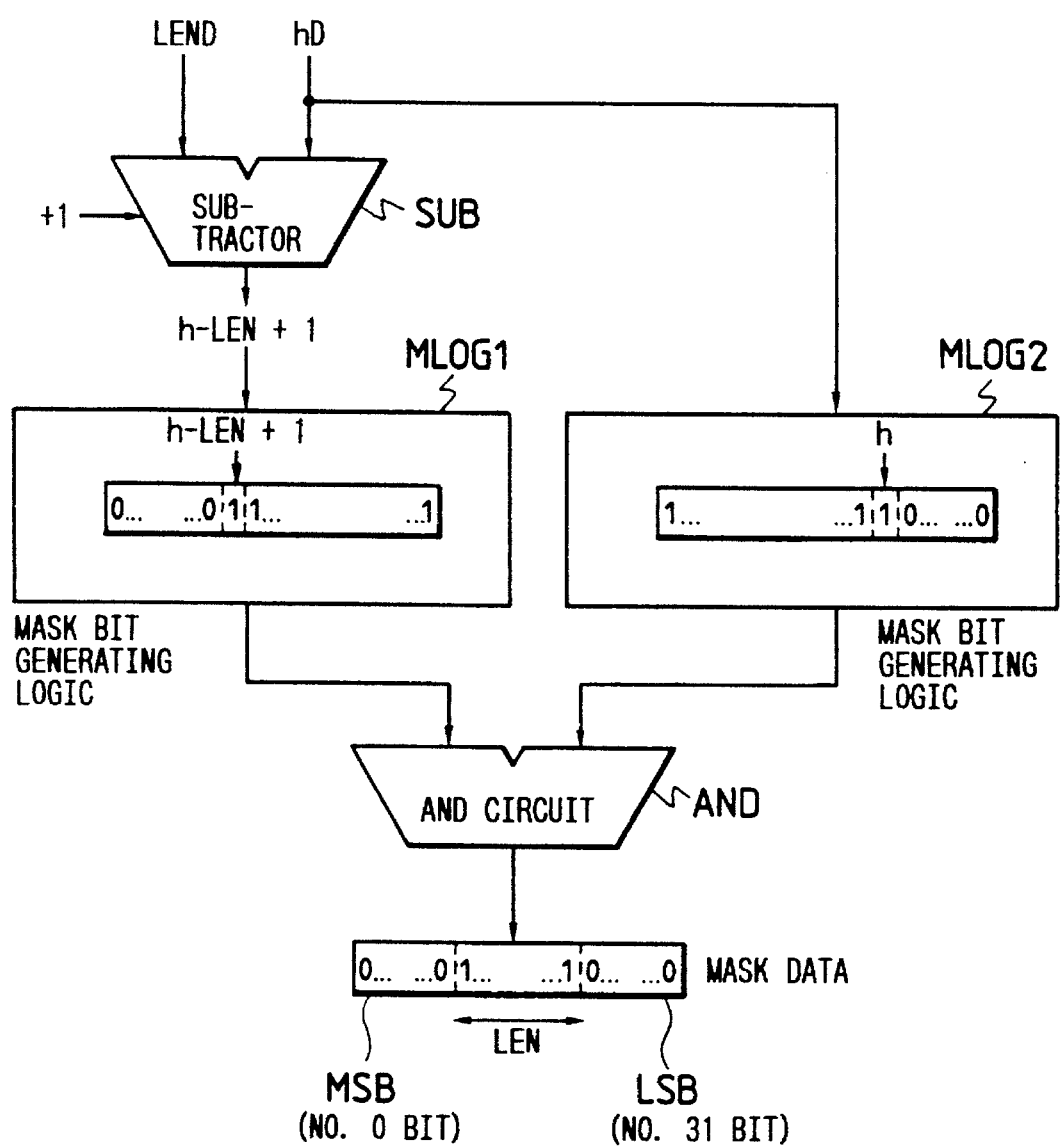
FIG. 18 is a diagram illustrating a mask data generating circuit using a subtracter.

As shown in FIG. 6, the mask data generating circuit MASKG is capable of generating the first mask data MASKD1 for use in the deposit instruction or the like by shifting the second mask data MASKD2 with the area given by the width LEN from the rightmost end, to the left (31-h bit shift) by the same amount as the operational data supplied to the first barrel shifter BSFT1 by means of the second barrel shifter BSFT2. As mask data for the extract instruction, the second mask data MASKD2 is utilized. Therefore, the mask data generating circuit MASKG is capable of generating the mask data for the deposit instruction and what is for the extract instruction as in the case of FIG. 18 without using a subtracter. Moreover, the second barrel shifter BSFT2 which is not utilized in generating the second mask data to be supplied to the expansion circuit EXT1, together with the first barrel shifter BSFT1, becomes utilizable for a different process under the extract instruction involved when it is executed.

[4] Increase in sign expansion shift under extract instruction.

Figure 7:
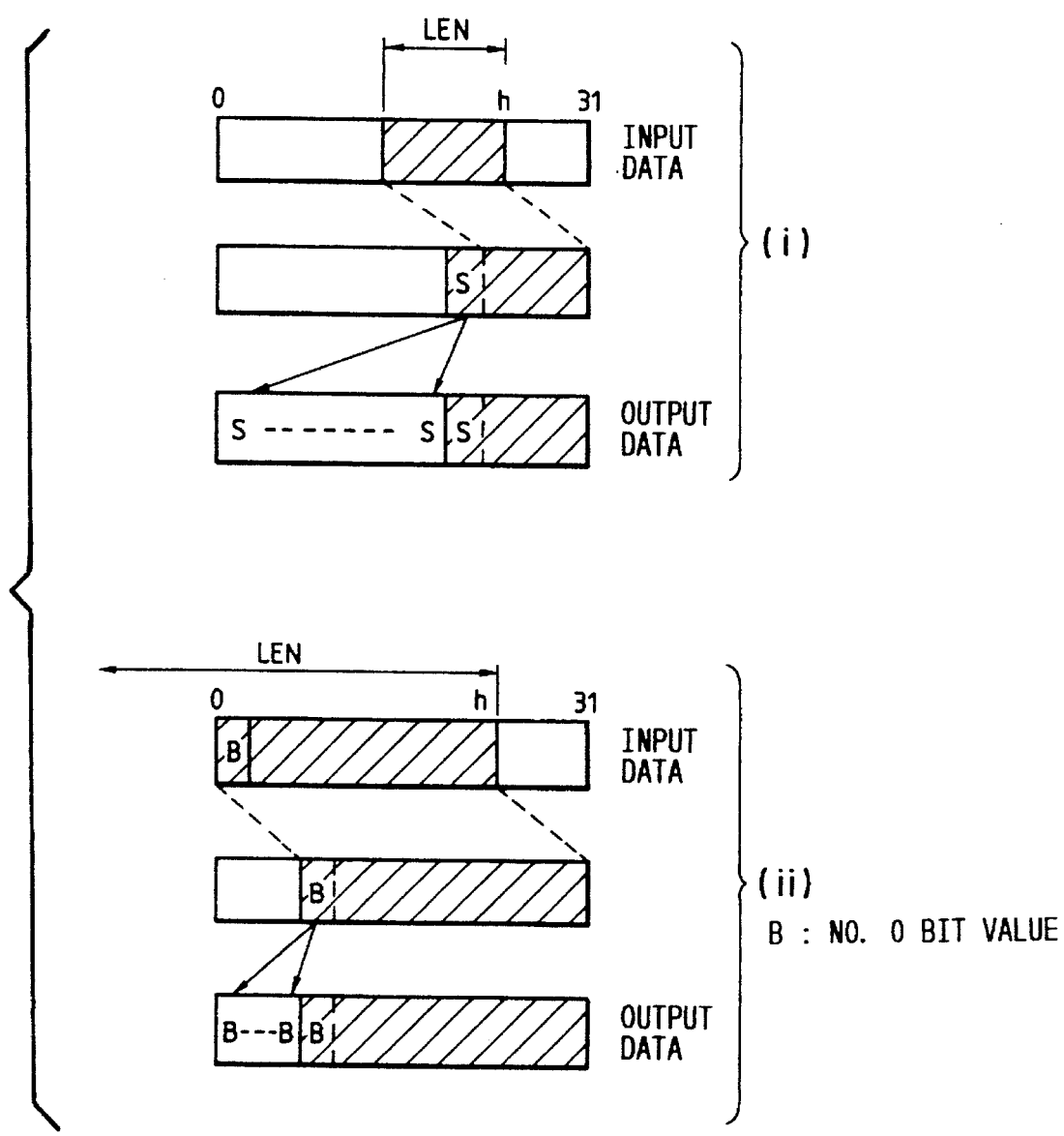
FIG. 7 is a diagram illustrating two kinds of sign expansion processes performed under an extract instruction

As shown in FIG. 7, there are two kinds of sign expansion (i), (ii) to be executed in the expansion circuit EXT 1 under the extract instruction. When the area width LEN does not exceed No. 0 bit of the input data as shown by (i), sign expansion in the output data is carried out in accordance with the bit sign at the leftmost end of the area width LEN involved. On the other hand, the sign expansion in the output data to be dealt with by making No. 0 bit of the input data a sign bit when the area width LEN extends to the left over the No. 0 bit of the input data as shown by (ii).

Figure 8:
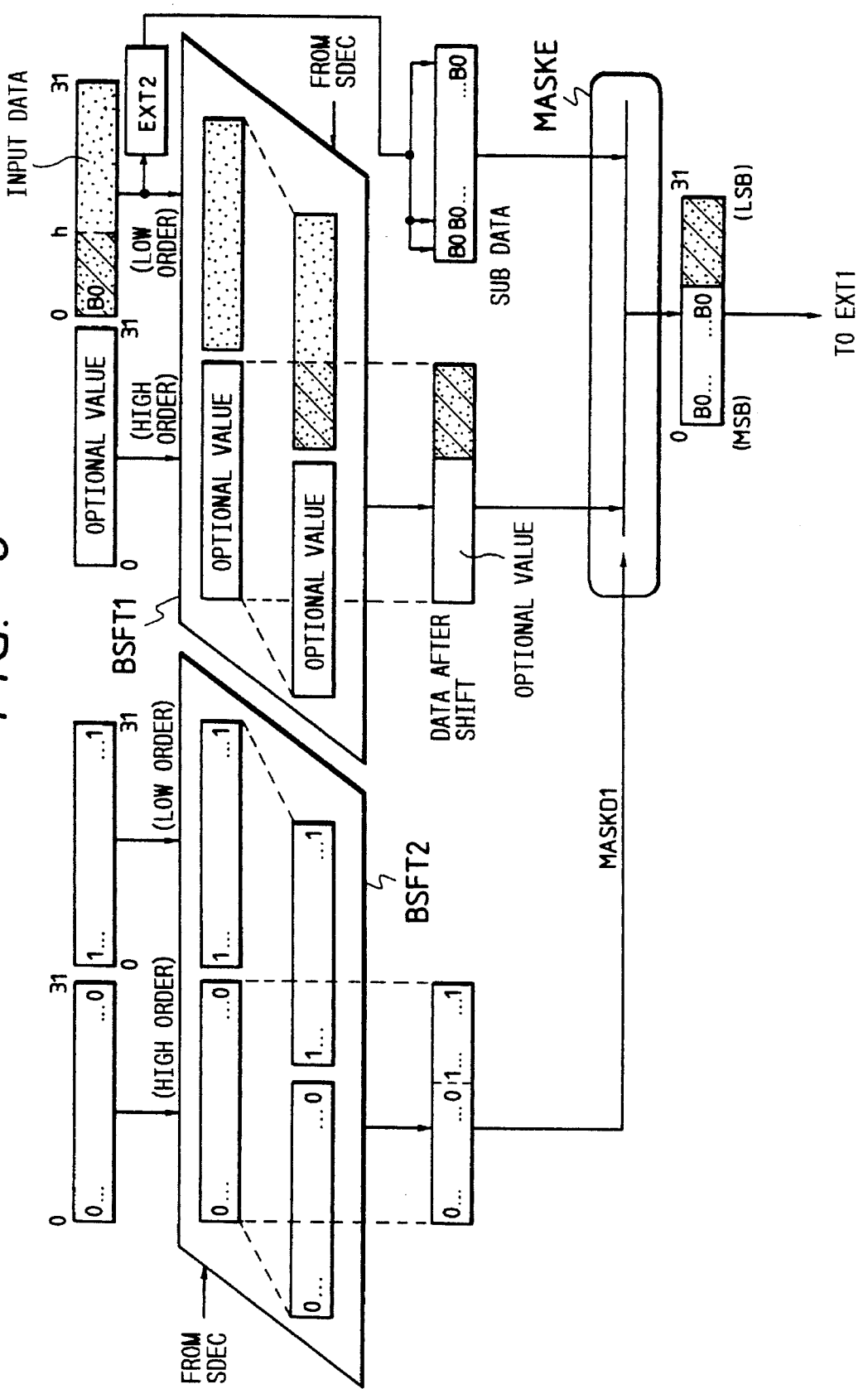
FIG. 8 is a diagram illustrating a parallel process for the barrel shift of input data and the No. 0 bit sign expansion thereof under the extract instruction.
Figure 9:
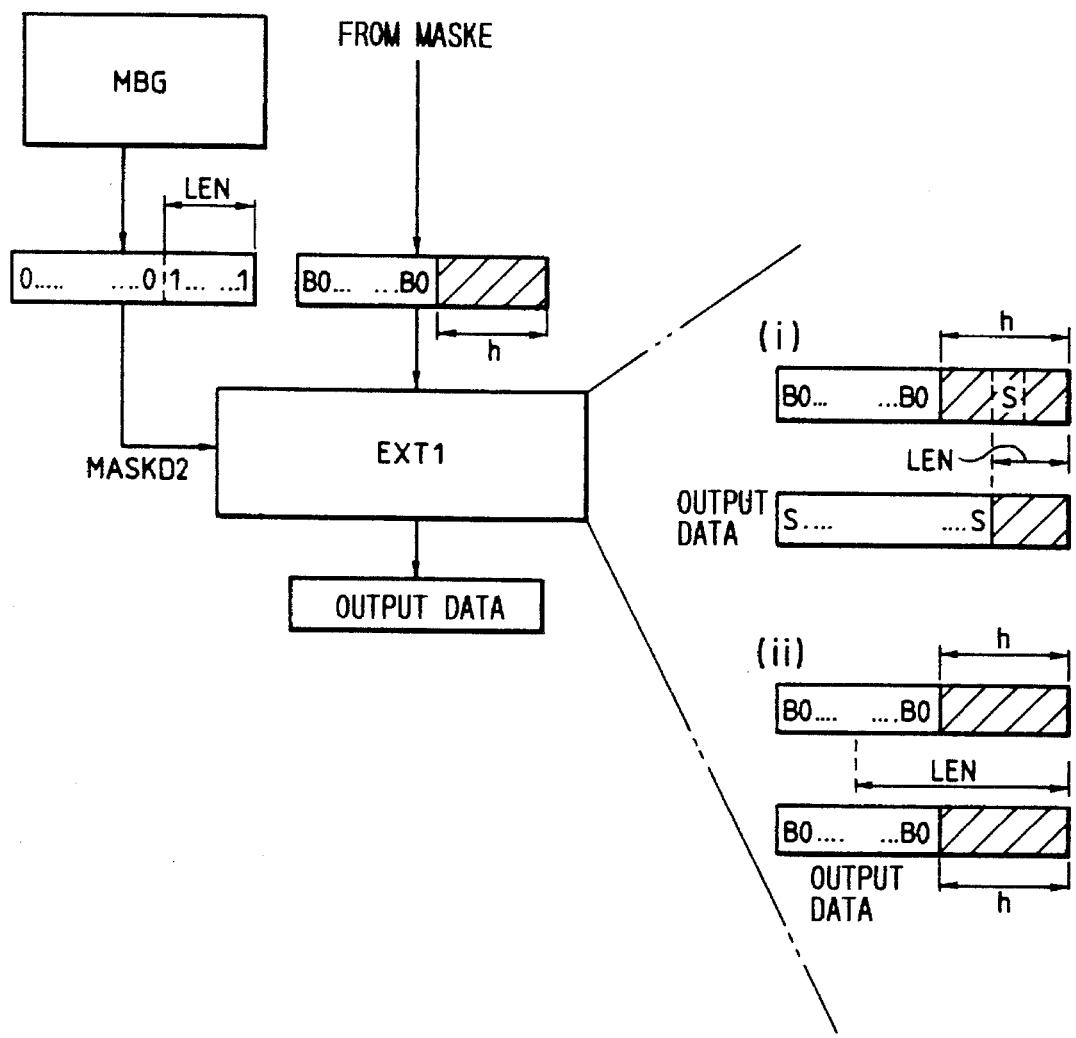
FIG. 9 is a diagram illustrating the process continued from what is shown in FIG. 8 when the extract instruction is executed.

As shown in FIG. 8, the first barrel shifter BSFT1 receives each 32-bit input data and an optional value of data "0," for instance, when the extract instruction is executed and carries out a barrel shift (31-h bit shift) in such a way that the No. h bit of the input data is located at its rightmost end. In parallel with the operation above, the No. 0 bit sign expansion circuit EXT2 subjects the No. 0 bit value of the input data to sign expansion over the whole bit. Further, the second barrel shifter BSFT2 receives 1-word data totally with bit "0" and another totally with bit "1" and performs the shift operation at the same shift amount as that in the first barrel shifter BSFT1 to generate the first mask data MASKD1. The mask execution circuit MASKE for receiving the output of the first barrel shifter BSFT1 and that of the No. 0 bit sign expansion circuit EXT2 selects and outputs the output of the first barrel shifter BSFT1 corresponding to the bit position at the logical value 1 in the first mask data MASKD1, whereas it selects and outputs the output of the "0" bit sign expansion circuit EXT2 corresponding to the bit position at the logical value 0 in the first mask data MASKD1. In this way, the data output form the mask execution circuit MASKE holds the value ranging from the No. 0 bit up to No. h bit of the input data close to the lower side (on the right), whereas the remaining bit is set as what holds the value of No. 0 bit of the input data. The output data of the mask execution circuit MASKE is supplied to the expansion circuit EXT1 as shown in FIG. 9. The second mask data MASKD2 is also supplied to the expansion circuit EXT1. The expansion circuit EXT1 subjects each left (upper) side bit of the area width LEN designated by the second mask data MASKD2 to sign expansion to make it a sign bit. Referring to FIG. 7(i), the bit position to be subjected to sign expansion is not in No. 0 bit of the input data but the sign bit S existing in the width h indicated by slanting lines. In accordance with the sign, that is, the logical value of the signal bit S designated by the second mask data MASKD2, it is subjected to sign expansion. As is obvious from FIG. 20, the bit corresponding to the boundary bit is transmitted to the sign line SIN-BIT, whereas the sign line SIN-BIT data is transferred to the remaining area. In the case of corresponding FIG. 7(ii), the output data from the expansion circuit EXT1 is considered equal to that of the mask execution circuit MASKE. In this case, as LEN exceeds No. 0 bit, the output of the mask execution circuit MASKE is selected by the selector SEL7.

Figure 10:
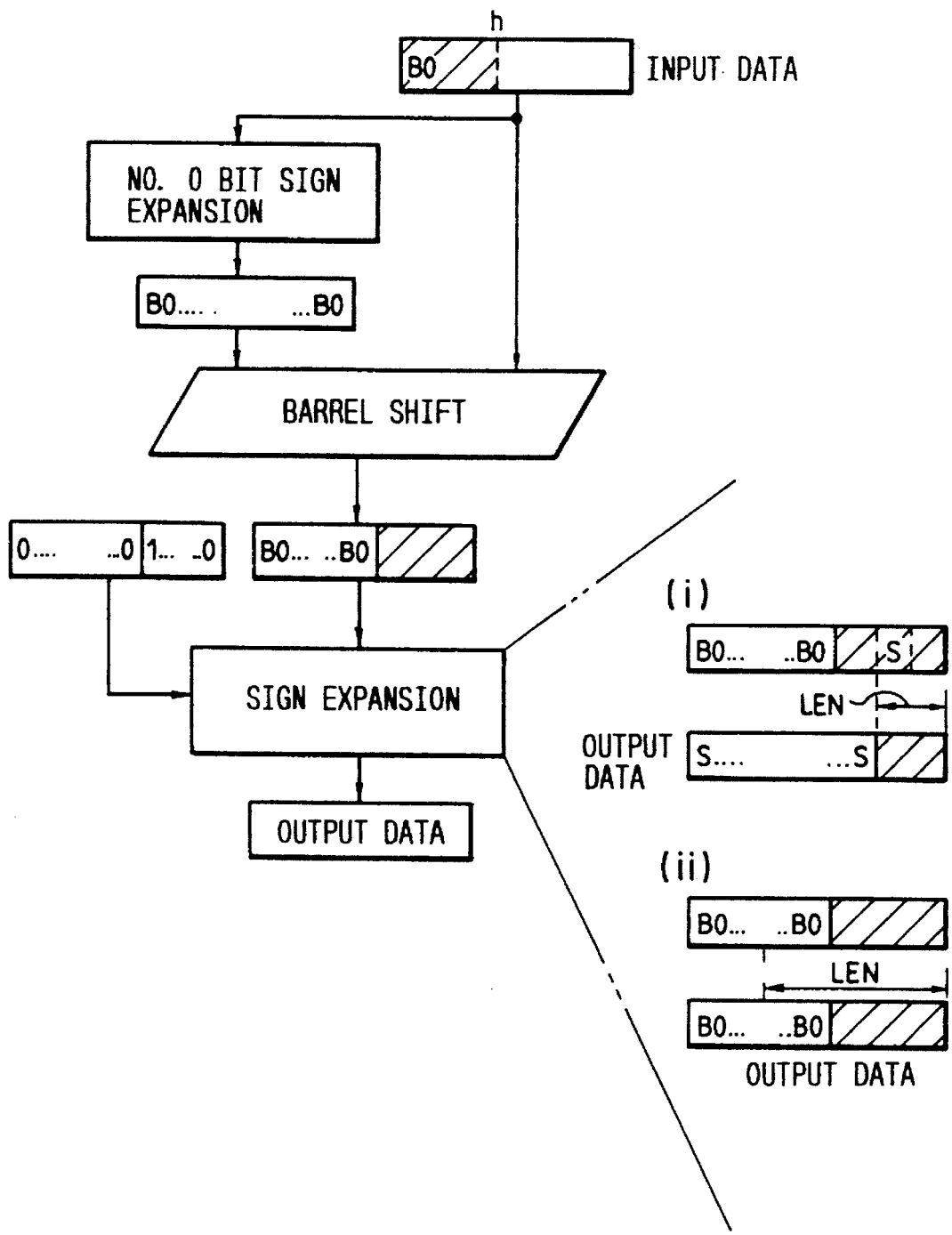
FIG. 10 is a diagram illustrating a dependent or a series process for No. 0 bit sign expansion and barrel shift with respect to the input data shown in FIG. 8.

In this way, the No. 0 bit sign expansion circuit EXT2 is used to subject the No. 0 bit value of the input data to sign expansion so as to make all the bits No. 0 bit in parallel to the barrel shift process of the input data by the first barrel shifter BSFT1 and the results thus obtained are selected by the mask execution circuit MASKE to implement a process similar to the arithmetic shift. In other words, the data whose bits totally have logical value 0 is supplied to the upper input of the second barrel shifter BSFT2 for generating mask data, whereas the data whose bits totally have logical value 1 is supplied to the lower input thereof. The first mask data MASKD1 is thus generated by shifting the input data by the first barrel shifter BSFT1 to the same extent. When the first mask data MASKD1 is used to perform the mask process in that the data subjected to sign expansion with all the bits of the input data that have been made No. 0 bit beforehand in connection with the shift output data of the first barrel shifter BSFT1, the arithmetic shift becomes an equal operation. In comparison with the dependent or serial process comprising the No. 0 bit sign expansion with respect to the input data and the barrel shift as shown in FIG. 10, the arithmetic operating method according to the present invention as shown in FIG. 8 makes it only necessary to supply an optional value to the upper input of the first barrel shifter BSFT1 and makes it unnecessary to wait for the No. 0 bit sign expansion process. According to this arithmetic shift operation, it is possible to increase the speed of executing the extract instruction in comparison with the barrel shift process followed by the generation of the sign expansion data through the pre-distribution of No. 0 bit of the input data to all the bits.

[5] Reduction in barrel shifter area.

Figure 11:
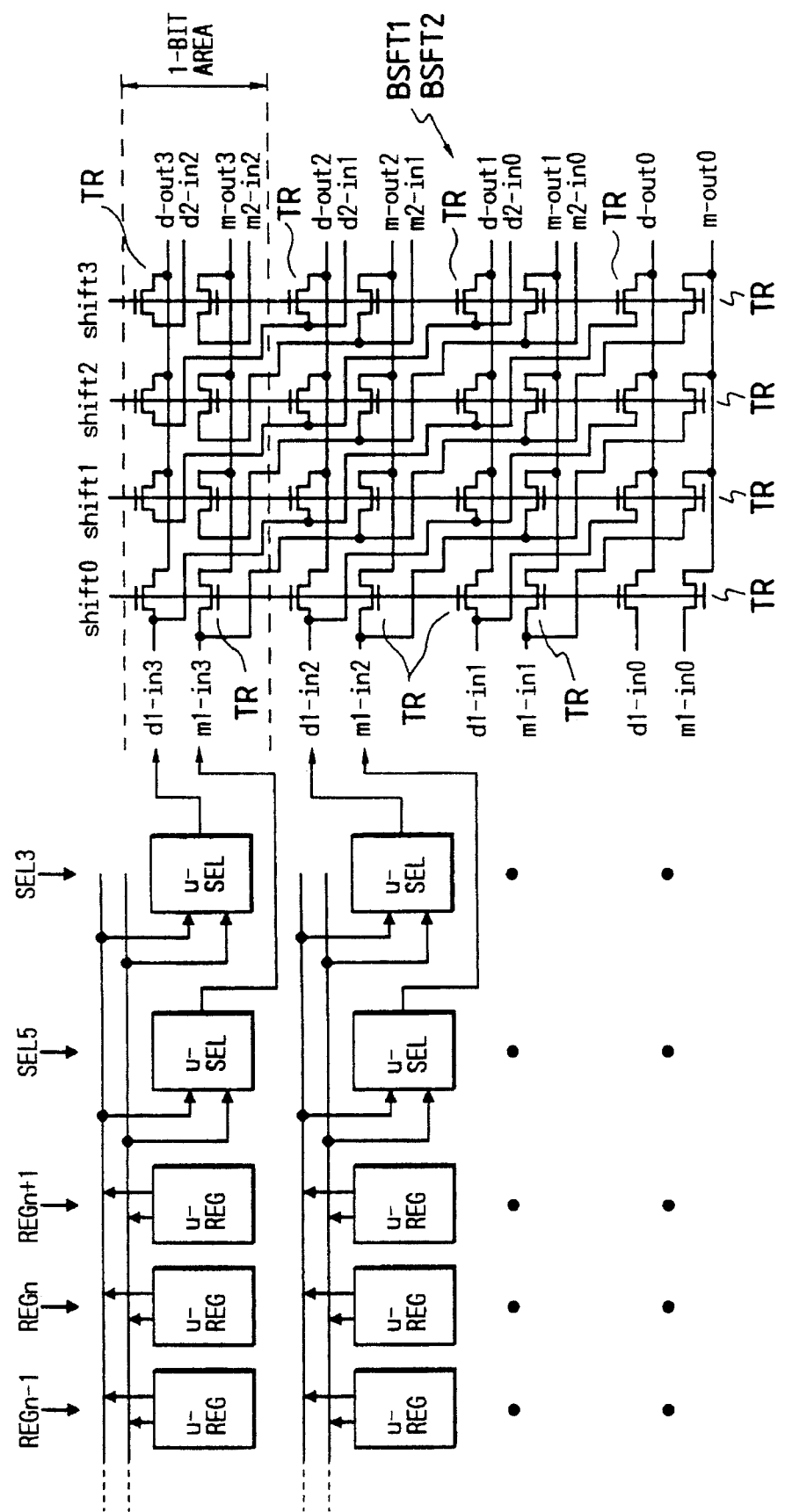
FIG. 11 is a circuit diagram illustrating a first and a second barrel shifter.

FIG. 11 is a circuit diagram illustrating first and second barrel shifters BSFT1, BSFT2 of this embodiment. Transistor trains of both the first and second barrel shifters BSFT1, BSFT2 are set parallel to each other in an area having the same width as that of the area occupied by 1-bit cells of the register file REGF for temporarily holding the arithmetic data and besides there is provided a common shift amount (which transmitting the control signal for controlling the shift amount) control line in both the first and second barrel shifters BSFT1, BSFT2. In FIG. 11, m1–in0, . . . denotes 32 lower input signal lines of the second barrel shifter BSFT2, m2–in0, . . . 32 upper input signal lines of the second barrel shifter BSFT2, m–out0, . . . 32 output signal lines of the second barrel shifter BSFT2, d1–in0, . . . 32 lower input lines of the first barrel shifter BSFT1, d2–in0, . . . 32 upper input lines of the first barrel shifter BSFT1, d–out0, . . . 32 output signal lines of the first barrel shifter BSFT1, and shift0, . . . a control line for designating the shift amount for use common to the first and second barrel shifters BSFT1, BSFT2. The output signal lines and the control lines are set in parallel to one another crosswise. Moreover, there are arranged a plurality of transistors TR, each for making the predetermined output signal line conduct when it is subjected to switching on receiving a shift amount designating signal at its selection terminal from the control line.

FIG. 11 illustrates a circuit diagram actually laid out on a chip; in addition, it shows part of the selector SEL3, part of the selector SEL5, and registers REG n−1, REG n, REG n+1 within the register file REGF. The selector comprises a plurality of unit selector U-SELs, whereas the register also comprises a plurality of memory cells. A bus is provided between the storage cell and the unit selector. As is obvious from FIG. 11, the area in which a transistor train is formed substantially corresponds in width to the area wherein the storage cells U-REG and the unit selectors U-SEL exist.

Figure 12:
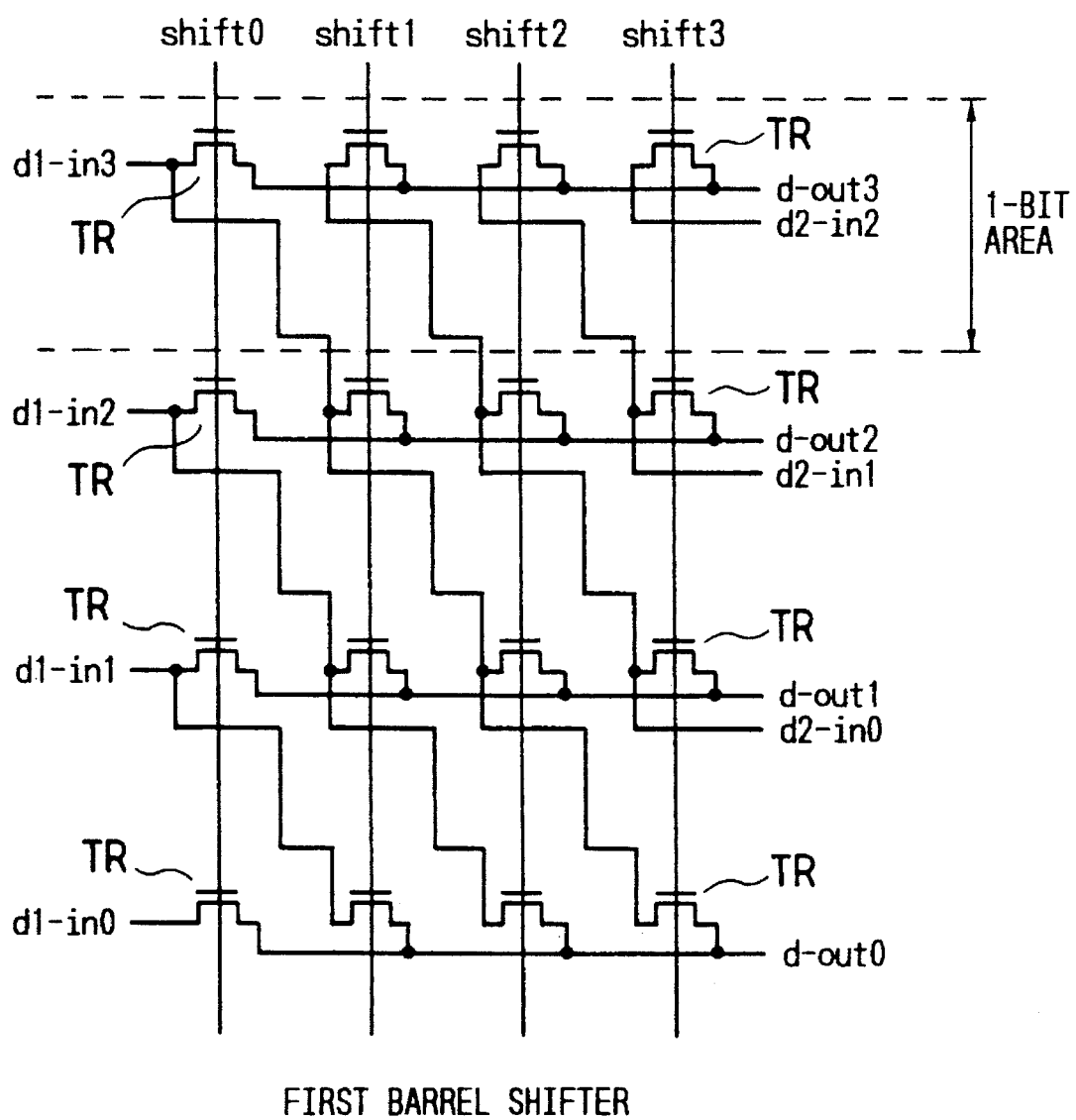
FIG. 12 is a circuit arrangement of the first barrel shifter out of the pair of barrel shifters shown in FIG. 11.
Figure 13:
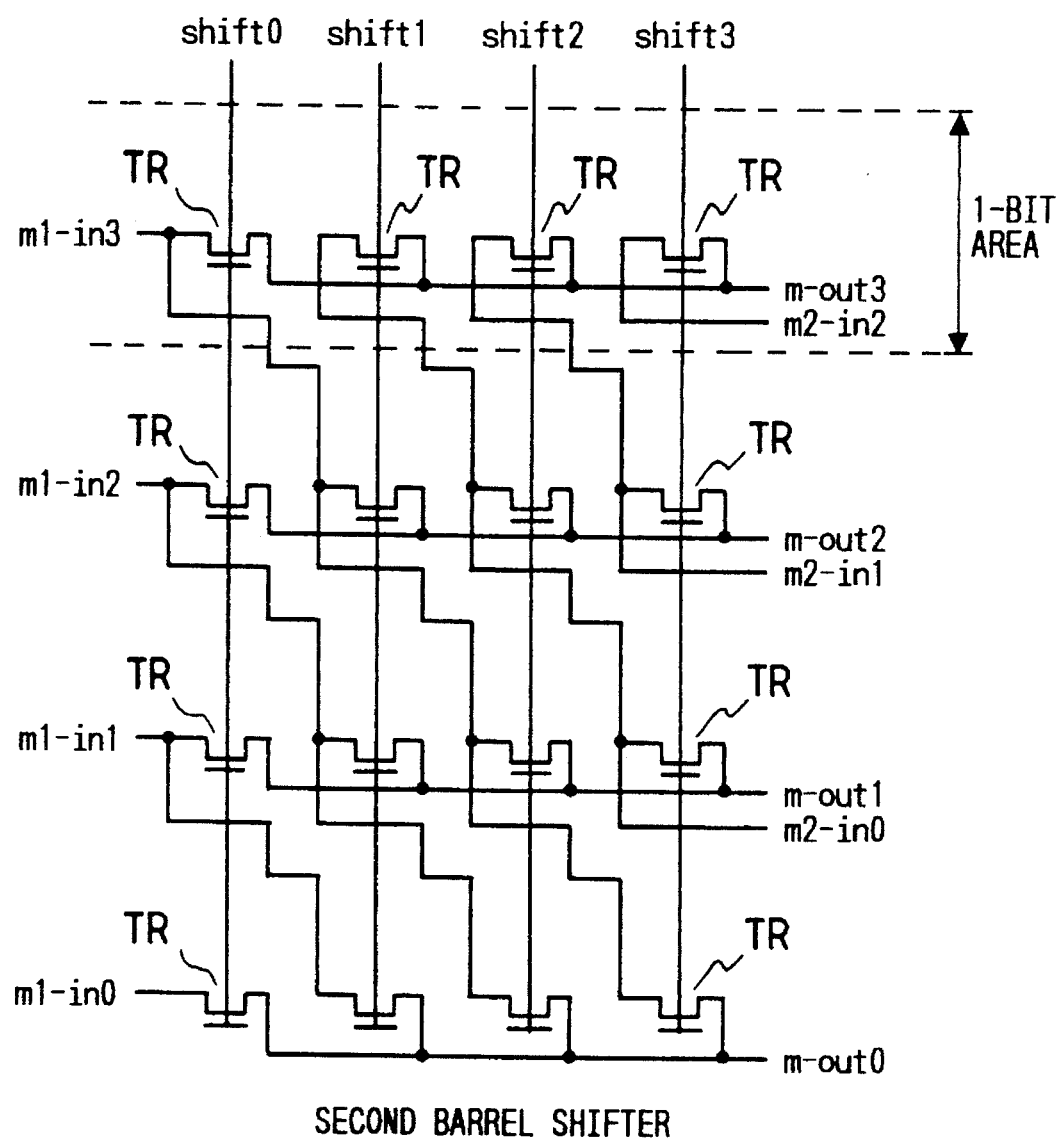
FIG. 13 is a circuit arrangement of the second barrel shifter out of the pair of barrel shifters shown in FIG. 11.
Figure 14:
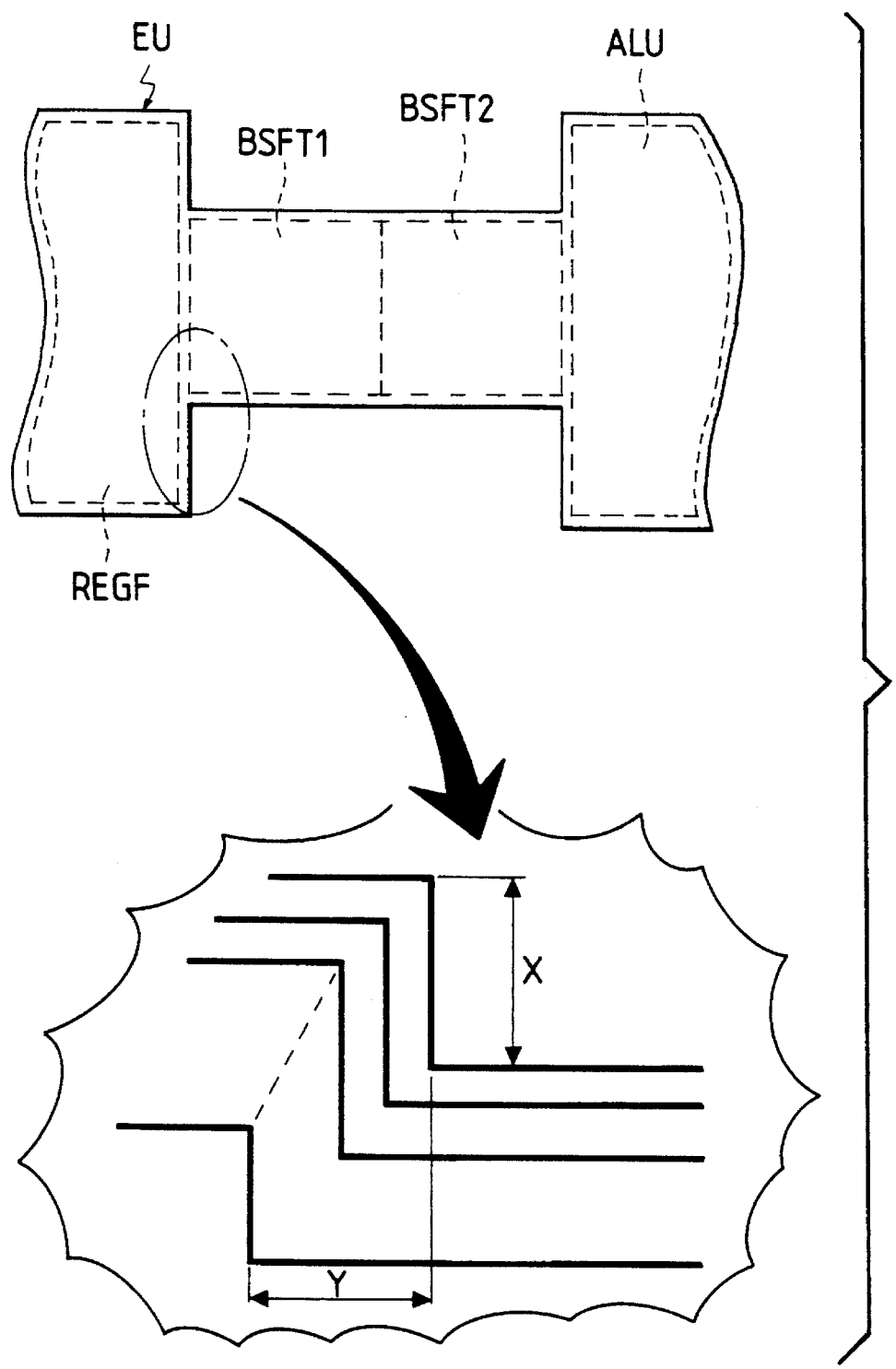
FIG. 14 is a diagram illustrating an enlarged lateral dimension on the assumption that the height of the area involved is decreased when the circuits shown in FIGS. 12 and 13 are separately laid out.

The memory cell U-REG of the register file REGF is formed principally with static flip-flops and when it is formed with a CMOS circuit, requires minimum six transistors. The arrangement of the six transistors conforms in height to the 1-bit area shown in FIG. 11. If the first and second barrel shifters BSFT1, BSFT2 are separately arranged in different areas, they may be laid out as shown in FIGS. 12 and 13, respectively. There are apparently many waste areas as shown in FIGS. 12 and 13. As shown in FIG. 11, data is supplied from the register file REGF via the separators and buses SB1, SB2 to the first and second barrel shifters BSFT1, BSFT2. It is desirable to lay out the transistors in the area defined as a rectangular area for a circuit block to be grasped function-to-function when the method of laying out the standard cells is taken into consideration. As the barrel shifters BSFT1, BSFT2 are supplied with data from the register file REGF in parallel and function intimately, it is not desirable for a delay in signal propagation to be allowed between the bits of data thus supplied in parallel. Consequently, the complicated and segregated curving of the signal line connecting the register file REGF and the barrel shifters BSFT1, BSFT2 should better be avoided as much as possible. In view of this, a space which is considered wasteful at a first glance is provided even when the barrel shifters BSFT1, BSFT2 are formed in different respective areas as shown in FIGS. 12 and 13, and transistors and input signal lines are arranged in areas on a bit area basis. In order to utilize the space effectively, the barrel shifters BSFT1, BSFT2 are positioned in parallel to each other in the same area, whereby even though the barrel shifters BSFT1, BSFT2 are employed, the actual chip area is prevented from increasing. As shown in FIG. 14, for instance, a reduction in the width of the barrel shifters BSFT1, BSFT2 makes it possible to reduce the area for the barrel shifters to be formed by the vertical dimension X. On the contrary, because of the layout wiring rule, that is, to provide predetermined intervals wire-to-wire in the curved portion of the wiring, the lateral dimension Y tends to increase and the area occupied by the chip of the integer arithmetic unit EU.

[6] Decoding logic for extracting sign bit position.

In the expansion circuit EXT1, the position of the sign bit for sign expansion with respect to the data output from the mask execution circuit MASKE is detected by the logic gate circuit LGC shown in FIG. 15 (equivalent to the decoder BDEC of FIG. 20). The logic gate circuit LGC has the logic of comparing the adjoining 2-bit logical values of the second mask data MASKD2 output from the mask bit generating circuit MBG by means of an exclusive-OR gate EOR and of outputting the boundary bit whose logical value varies in the bit string of the second mask data MASKD2 with what is different from those of other bits. The logic gate circuit LGC is capable of cutting out the position of the sign bit for sign expansion by passing each bit of the second mask data MASKD2 through one stage of the exclusive-OR gate EOR. Therefore, another decoder for receiving and decoding the data LEN can be dispensed with and this contributes to scaling down the expansion circuit EXT1. The decoding logic necessitates no circuit for generating the complementary level from a signal to be decoded and this makes the wiring pattern simple as compared with a conventional decode circuit and also decreases the number of circuit elements, thus contributing to reducing the layout area of the integer arithmetic unit EU.

The logic gate circuit LGC is applicable to other uses as a general decoder together with a circuit like the mask bit generating circuit MBG. At this time, the circuit like the mask bit generating circuit MBG can be defined as a means for developing, out of the n-bit data, any one of the data of the No. n-th power of 2 differentiated by the number of bits of the constant logical value continuously arranged from the end of the bit string. The logic gate circuit compares the adjoining 2-bit logical values of the data output from the above-mentioned developing means and outputs the boundary bit whose logical value varies in the bit string of the data output from the developing means with what is different from those of other bits.

The following functional effect is obtainable from the embodiment above.

(1) The barrel shifters BSFT1 and BSFT2 are respectively used for shifting the input data and generating the mask data, and the shift amount in both cases is set equal to each other. This contributes to increasing the function and speed of the arithmetic unit SMU supporting the bit field operations under the deposit and extract instructions.

(2) The transistor trains in the respective two sets of barrel shifters BSFT1 and BSFT2 are stacked in laying out them in conformity with the 1-bit memory cell width of the register file, whereby the area occupied by the bit field operational arithmetic unit SMU can be reduced.

(3) No. 0 bit sign expansion with respect to the input data and the barrel shift of the input data at parallel timing thus can be processed. The result obtained from the parallel process is selected by the mask execution circuit MASKE on the basis of the first mask data MASKD1 generated in the second barrel shifter BSFT2 before being subjected to the arithmetic shift, the result of which is further subjected to sign expansion in the expansion circuit EXT1. The operating speed of extracting an optional area of data under the extract instruction can thus be increased.

(4) With the logic gate circuit LGC for receiving such data as the second mask data MASKD2 and outputting the decoded result, no circuit for converting the input into a signal at a complementary level is needed for the decoder. Consequently, the expansion circuit EXT1 and moreover the decoder circuit can be scaled down and this means the area occupied by the chip can also be reduced.

(5) With the above-mentioned functional effect, the area occupied by the chip is prevented from increasing, whereas the operating speed is increased, whereby a high-functional RISC processor becomes available.

Another barrel shifter embodying the present invention will subsequently be described. This barrel shifter which will subsequently be described may be used as not only the barrel shifter BSFT1 or BSFT2 but also a barrel shifter for a different processor, for instance, a co-processor.

Figure 30:
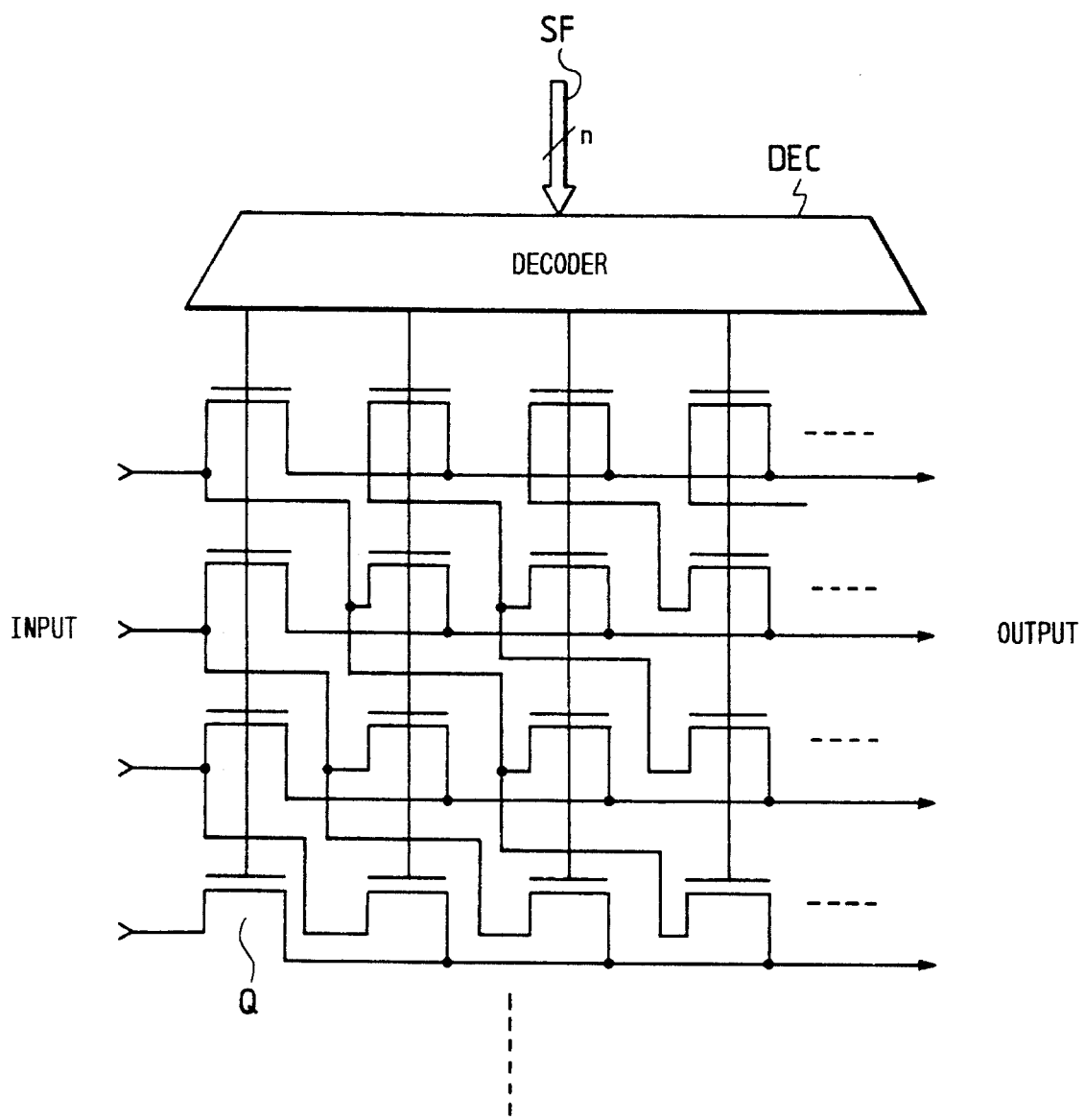
FIG. 30 is a circuit diagram of a convention barrel shifter circuit.

A barrel shifter circuit may be provided, as shown in FIG. 30 and also shown in FIGS. 12 and 13, with a plurality of MOS transistors Q in a matrix. In the case of a barrel shifter circuit for optionally shifting, for instance, up to $N=2^n$, there are arranged N×N MOS transistors Q in a matrix, whereby when a predetermined MOS transistor Q train totally corresponding to the shift control data SF involved is made conductive by the output of a decoder DEC for decoding n-bit shift control data SF, an optional bit may be shifted according to the shift control data SF.

Japanese Patent Laid-Open No. 90318/1990 discloses a barrel shifter of the sort described above.

In the barrel shifter circuit of FIG. 30, there arises the necessity of providing the decoder DEC for decoding n-bit shift control data SF for generating a control signal of each of the MOS transistors Q constituting the barrel shifter circuit. The decode time in the decoder DEC, that is, the time required for the decode output to be confirmed after the shift control data SF is supplied to the decoder DEC restricts the operating speed in the barrel shifter circuit. Since it is necessary to provide the decoder DEC, the present inventors have found that the area occupied by the barrel shifter circuit in a LSI chip remains unreducible.

One of the objects stated above can be accomplished by constructing the barrel shifter circuit as follows:

With n as a positive integer, a barrel shifter circuit is formed by combining n shift circuits together for making possible $2^i$ (i=0, 1, 2, ..., n−1) bit data shift.

In order to make it possible to shift the number of optional bits up to $2^n$ with respect to the input data equivalent to two words corresponding to the n-bit shift control data, the barrel shift circuit is formed with a first shift circuit group for shifting the input data equivalent to one word out of the two words toward to upper or lower side and a second shift circuit group for shifting the input data equivalent to the other one word. In this case, n shift circuits are combined to form the first and second shift circuit groups capable of making possible $2^i$ (i=0, 1, 2, ..., n−1) bit data shift. The shift outputs of the first and second circuit groups are combined to obtain an output equivalent to one word. Moreover, when the shift control data received by the first shift circuit group is inverted and input to the second shift circuit group as shift control data, the output of the first shift circuit group and that of the second shift circuit group are properly combined in such a way that, irrespective of the shift control data, the 1-bit shift circuit for shifting the input data by one bit should be included in the second shift circuit group. In this case, the word may be either 8, 16 or 32, whereas the optional bit number may be per unit.

In a concrete terms, the n shift circuits may include a gate circuit for switching the data through state to and from the data shift state in response to the shift control data.

With the arrangement above, the n shift circuits capable of respectively shifting data bits $2^i$ (i=0, 1, 2, ..., n−1) is capable of the $2^n$ bit shift operation of the input data in response to the n-bit shift control data, whereby a decoder for decoding the n-bit shift control data can be dispensed with.

Figure 28:
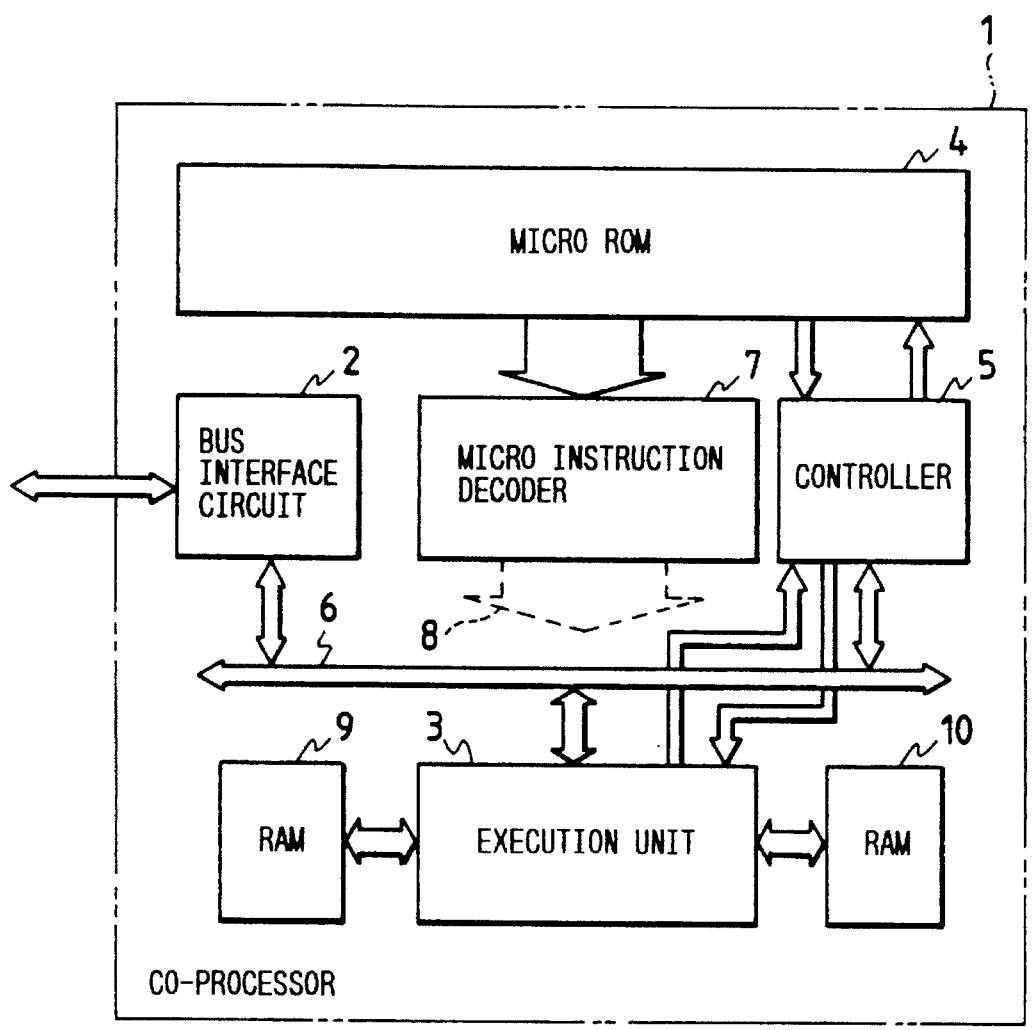
FIG. 28 is a block diagram illustrating a co-processor configuration in the barrel shift circuit of the embodiment.

FIG. 28 illustrates a co-processor configuration in the barrel shift circuit of the embodiment. The co-processor 1 shown therein is formed on one semiconductor substrate like a silicon substrate produced through the known process of manufacturing semiconductor integrated circuits, though not restricted to this.

The co-processor 1 is designed to compensate for the operational ability of an external main processor (not shown) to be coupled via a bus interface circuit 2 or to lessen the operational burden to be born by the main processor and to perform predetermined operations based on the instructions from the main processor. As shown in FIG. 28, the co-processor 1 is provided with a micro ROM (Read Only Memory) 4 accommodating a microprogram designated a predetermined operational procedure and the like. The micro ROM 4 can be accessed by a controller 5 and thereby microinstructions constituting the microprogram are sequentially read out.

The controller 5 operates to fetch the command given from the main processor (not shown) via the bus interface circuit 2 and an internal bus 6 and to gain access to the micro ROM 4 on the basis of the address signal obtainable from decoding the command code included in the command or the address data included in the command. The initial microinstruction of microinstruction groups in series for performing the operations designated by the command is read from the micro ROM 4. The second microinstruction onward out of microinstruction groups in series for performing the operation designated by the command is designated when the next address field data on the microinstruction immediately before being read is supplied to the controller 5. The microinstruction thus read from the micro ROM 4 is supplied to a microinstruction decoder 7. The microinstruction decoder 7 decodes the microinstruction given and generates a control signal for an execution unit 3. While the execution unit 3 is performing operations under the microinstruction, the execution unit 3 instructs the controller 5 to that effect when microflow branching becomes necessary.

The execution unit 3 is coupled to the internal bus 6 and also to a pair of RAMs 9, 10. RAMs 9, 10 are used to prestore externally supplied data necessary for operations and also as temporary registers at the time the operations are performed. Control of gaining access to the RAMs 9, 10 are exerted according to a control signal 8 from the microinstruction decoder 7. When the predetermined areas of RAMs 9, 10 are utilized as temporary registers at the time of floating-point operation, RAMs 9, 10 perform the read modify right operation in that the source data are read from RAMs 9, 10 and the source data thus read therefrom are processed before being returned to RAMs 9, 10 as destination data.

Figure 29:
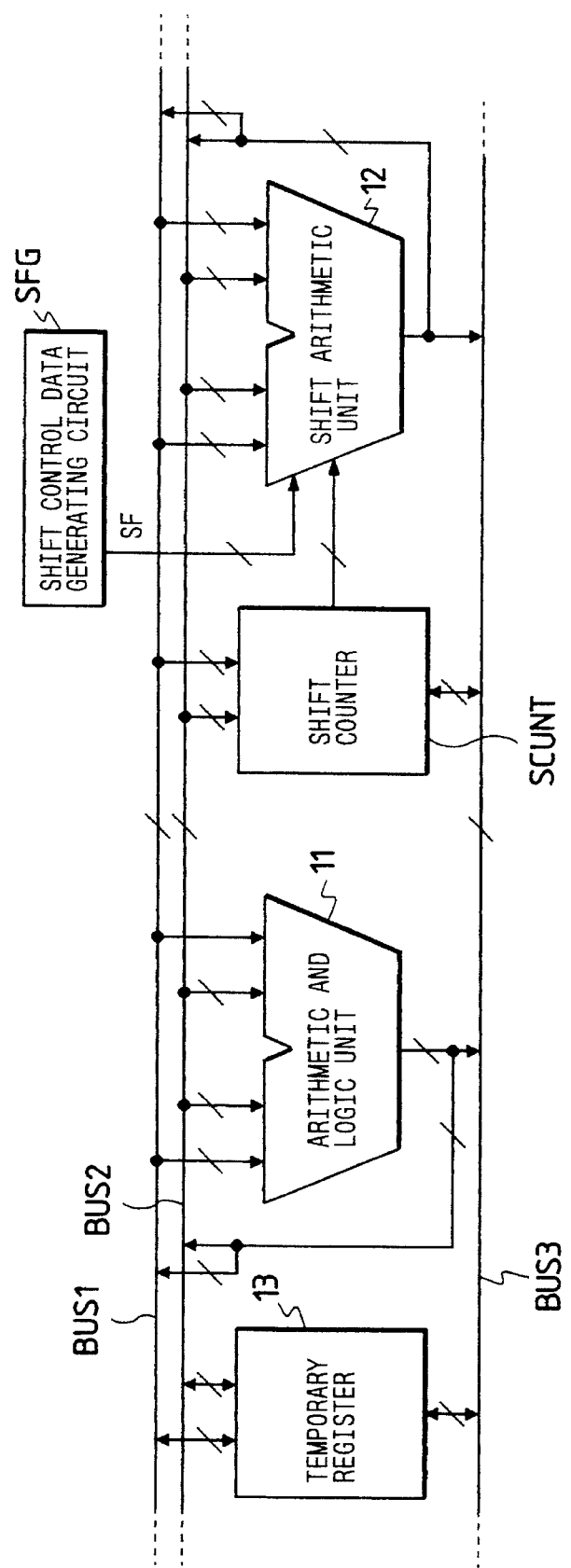
FIG. 29 is a block diagram illustrating an execution unit configuration in the co-processor.

FIG. 29 illustrates a configuration of the execution unit 3.

This execution unit 3 includes internal 32-bit buses BUS1, BUS2, BUS3, though not restricted to these. An arithmetic and logic unit 11, a shift arithmetic unit 12, a shift counter SCUNT and a temporary register 13 are coupled to these internal buses BUS1, BUS2, BUS3. In this case, the temporary register 13 may be allocated to the predetermined areas of RAMs 9, 10.

FIG. 29 also illustrates a shift control data generating circuit SFG included in the controller 5. For instance, the command, like the instruction in the embodiment above, includes data representing the shift amount. The shift control data generating circuit SFG retrieves, for instance, the shift amount from the command and supplies it to the shift arithmetic unit 12 as shift control data SF.

Figure 21:
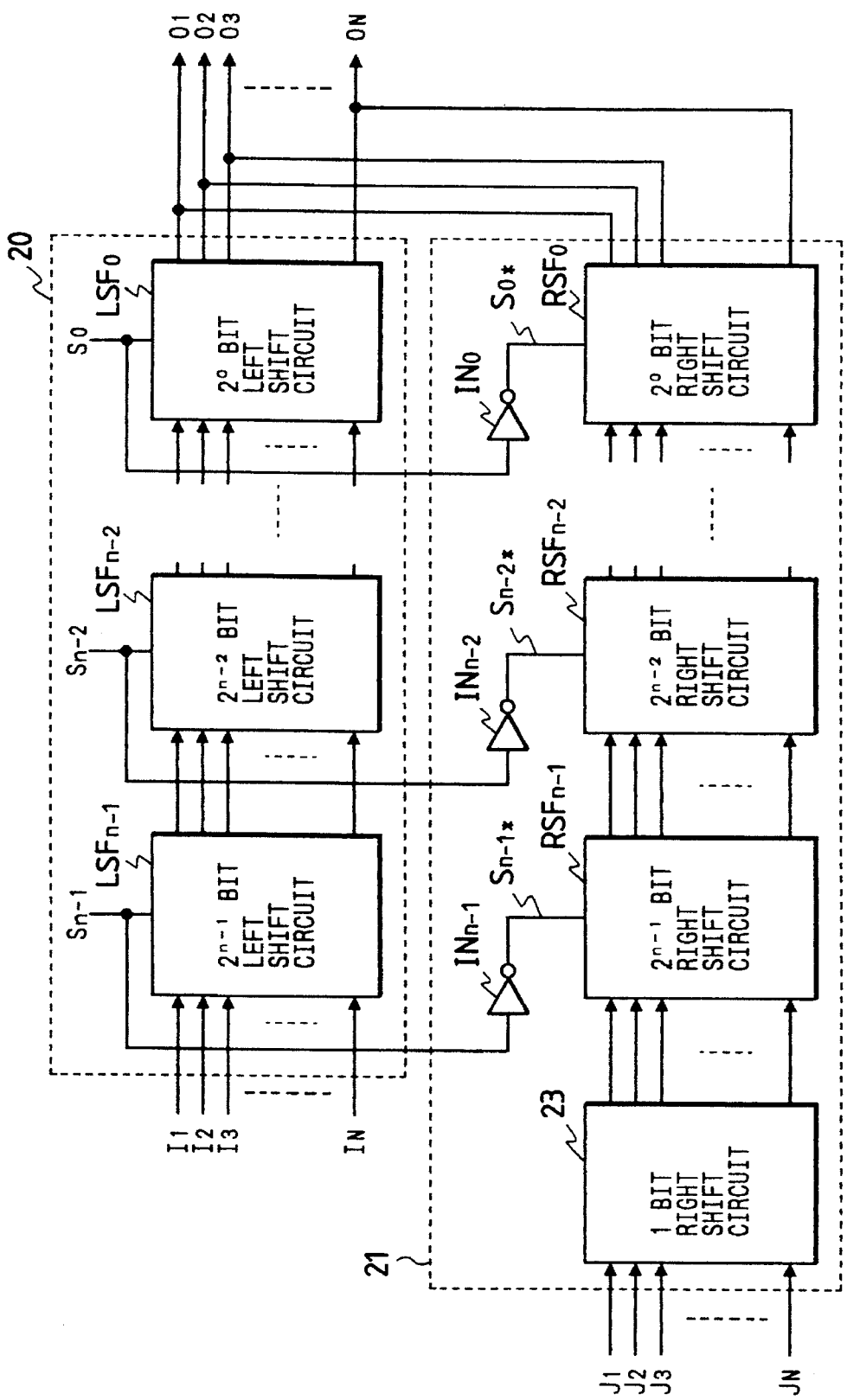
FIG. 21 is a block diagram illustrating another exemplary barrel shift circuit.

FIG. 21 illustrates a configuration of the shift arithmetic unit 12 in detail.

With N and n as positive integers, though not restricted to theses, the shift arithmetic unit 12 has a barrel shift circuit capable of shifting the optional number of bits up to $N=2^n$ with respect to input data equivalent to 2 words in response to n-bit shift control data (coded data) $S0, \ldots, S_{n-2}, S_{n-1}$. The barrel shift circuit includes a left shift circuit group 20 for shifting input data equivalent to one word as shown by I1 to IN and a right shift circuit group 21 for shifting input data equivalent to one word as shown by J1 to JN.

Figure 24:
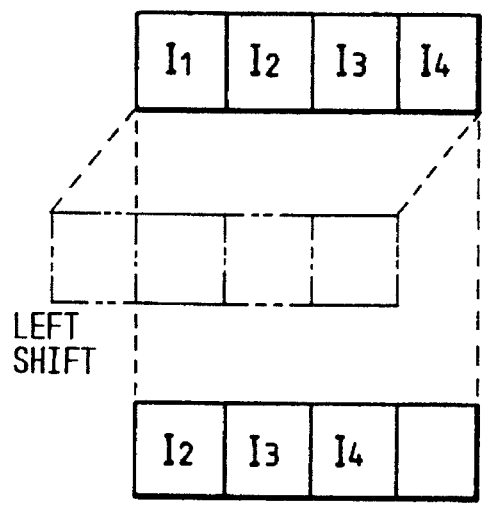
FIG. 24 is a diagram illustrating an input data shift to the left.
Figure 25:
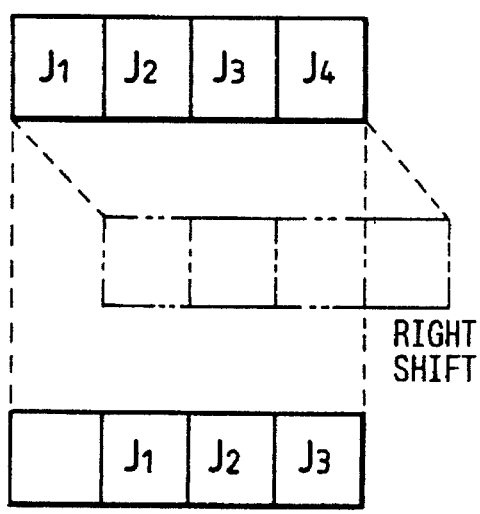
FIG. 25 is a diagram illustrating an input data shift to the right.

In the case of left shift, though not restricted to the following case, the input data are shifted to the upper side in such a way that, as shown in FIG. 24, the shifting of input data I1, I2, I3, I4 results in a data set of I2, I3, I4, whereas in the case of right shift, the input data are shifted to the lower side in such a way that, as shown in FIG. 25, the shifting of input data J1, J2, J3, J4 results in a data set of J1, J2, J3.

As shown in FIG. 30, the left and right shift circuit groups 20, 21 make unnecessary the decoder DEC for decoding the n-bit shift control data SF and are consequently configured as follows.

The left shift circuit group 20 is provided with n serial shift circuits $LSF0, \ldots, LSF_{n-2}, LSF_{n-1}$ for respectively shifting $2^i$-bit (i=0, 1, 2, ..., n-1) data. The shift circuit $LSF_{n-1}$, for instance, functions as what shifts input data I1 to IN equivalent to one word to the left by $2^{n-1}$ bits when the shift control data $S_{n-1}$ is asserted to be high in level. The shift circuit $LSF_{n-2}$ arranged at the following stage functions as what shifts input data to the left by $2^{n-2}$ bits when the shift control data $S_{n-2}$ is asserted to be high in level. The shift circuit LSF0 situated at the still following stage functions as what shifts input data to the left by $2^0$ bits (i.e., one bit) when the shift control data S0 is asserted to be high in level.

Like the left shift circuit group 20, the right shift circuit group 21 is provided with n serial shift circuits $RSF0, \ldots, RSF_{n-2}, RSF_{n-1}$ for respectively shifting $2^i$-bit (i=0, 1, 2, ..., n-1) data. At its initial input stage, moreover, there is arranged a 1-bit right shift circuit 23 for shifting input data J1 to JN equivalent to one word to the right by one bit, irrespective of the shift control data $S0, \ldots, S_{n-2}, S_{n-1}$, to ensure that the shift output of the left shift circuit group 20 is properly combined with that of the right shift circuit group 21 as will be described later. The shift circuit $RSF_{n-1}$ disposed at the following stage of the shift circuit 23 functions as what shifts input data to the right by $2^{n-1}$ bits when the shift control data $S_{n-1}*$ (* indicates data inversion or what is low-active) resulting from what has been inverted by an inverter $IN_{n-1}$ is asserted to be high in level. The shift circuit $RSF_{n-2}$ arranged at the still following stage functions as what shifts input data to the right by $2^{n-2}$ bits when the output data $S_{n-2}*$ of an inverter $IN_{n-2}$ for inverting the shift control data $S_{n-2}$ is asserted to be high in level. The shift circuit RSF0 situated at the still following stage functions as what shifts input data to the right by $2^0$ bits (i.e., one bit) when the output data S0* of an inverter IN0 for inverting the shift control data S0 is asserted to be high in level.

The outputs of the left and right shift circuit groups 20, 21 are combined into one word and converted into the outputs 01 to 0N of the barrel shift circuit.

The shift circuits (excluding the 1-bit left shift circuit 23) included in the left and right shift circuit groups 20, 21 are relative simply formed with gate circuits for switching the data through state to and from the data shift state in response to the shift control data $S0, \ldots, S_{n-2}, S_{n-1}$.

Figure 22:
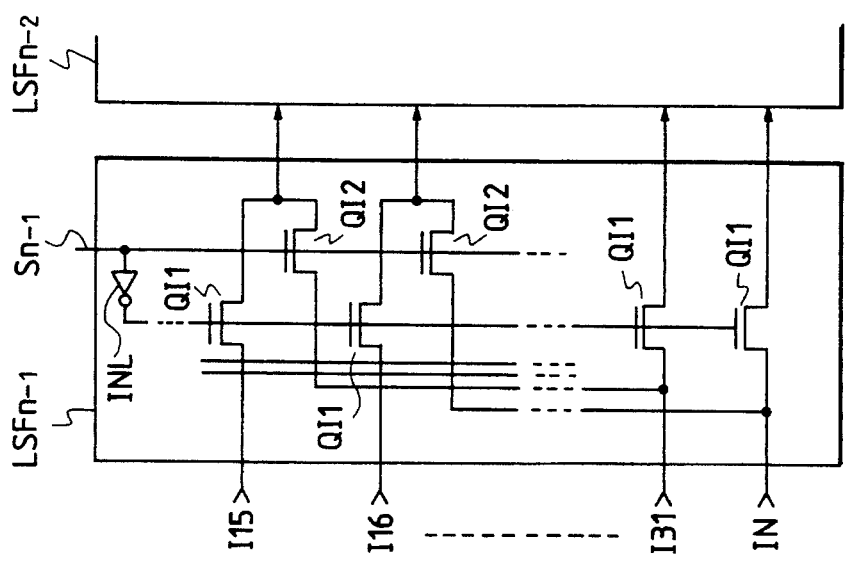
FIG. 22 is a circuit diagram illustrating a left shift circuit arrangement in the barrel shift circuit of FIG. 21.

For instance, the shift circuit $LSF_{n-1}$ for shifting one word input data I1 to IN to the left by $2^{n-1}$ bits includes, as shown in FIG. 22, a plurality of N-channel MOSFETQI1 which are ON/OFF controlled by the output of the inverter INL for inverting the shift control data $S_{n-1}$ and a plurality of N-channel MOSFETQI2 which are ON/OFF controlled by the shift control data $S_{n-1}$. With the inverter INL held therebetween, the plurality of MOSFETQI1 and MOSFETQI2 are complementarily turned ON/OFF and the pair of MOSFETQI1 and MOSFETQI2 constitute a multiplexer for selecting the input data I1 to IN. In other words, the plurality of MOSFETQI1 are held ON and the plurality of MOSFETQI2 are held OFF when the shift control data $S_{n-1}$ is set at low levels, whereby the input data I1 to IN as they are (in the unshift state) are transmitted to the shift circuit $LSF_{n-2}$ at the following stage (the through state). On the contrary, the plurality of MOSFETQI1 are held OFF and the plurality of MOSFETQI2 are held ON when the shift control data $S_{n-1}$ is set at high levels, whereby the bits of the input data I1 to IN are shifted before being transmitted to the shift circuit $LSF_{n-2}$ at the following stage (in the shift state). As the data shift amount in the shift circuit $LS_{n-1}$ is set to $2^{n-1}$ bits, data In31 in place of data I15, for instance, is allocated and data IN in place of data I16 is allocated likewise. With the data selection, $2^{n-1}$ bits of input data I1 to IN can thus be shifted.

Figure 23:
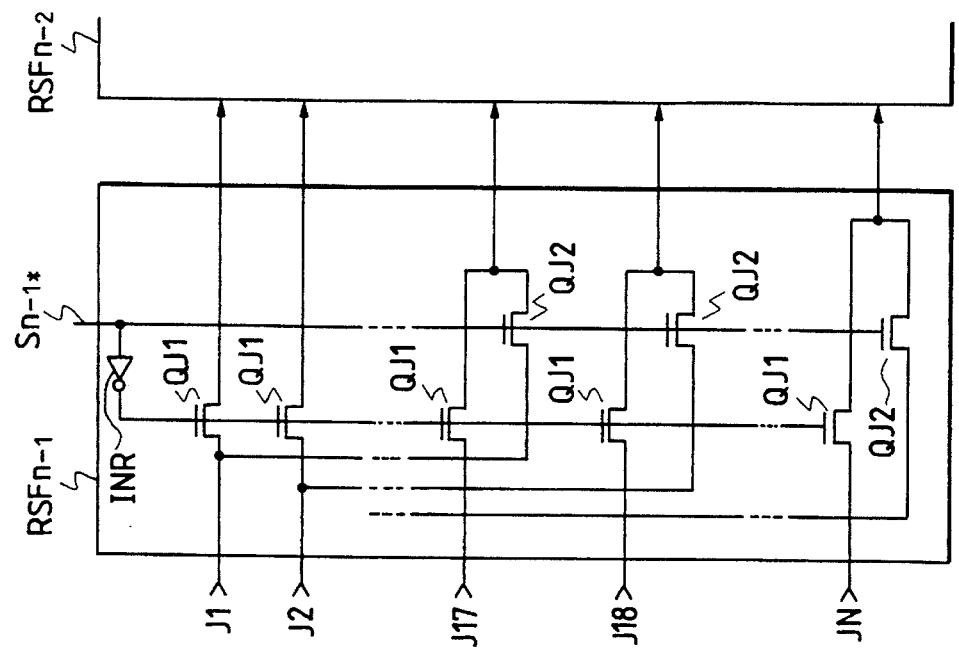
FIG. 23 is a circuit diagram illustrating a right shift circuit arrangement in the barrel shift circuit of FIG. 21.

Similarly, the shift circuit $RSF_{n-1}$ for shifting one word input data J1 to JN to the left by $2^{n-1}$ bits includes, as shown in FIG. 23, a plurality of N-channel MOSFETQJ1 which are ON/OFF controlled by the output of the inverter INR for inverting the shift control data $S_{n-1}*$ and a plurality of N-channel MOSFETQJ2 which are ON/OFF controlled by the shift control data $S_{n-1}*$. With the inverter INR held therebetween, the plurality of MOSFETQJ1 and MOSFETQJ2 are complementarily turned ON/OFF and the pair of MOSFETQJ1 and MOSFETQJ2 constitute a multiplexer for selecting the input data J1 to JN. In other words, the plurality of MOSFETQJ1 are held ON and the plurality of MOSFETQJ2 are held OFF when the shift control data $S_{n-1}*$ is set at low levels, whereby the input data J1 to JN as they are (in the unshift state) are transmitted to the shift circuit $RSF_{n-2}$ at the following stage (the through state). On the contrary, the plurality of MOSFETQJ1 are held OFF and the plurality of MOSFETQJ2 are held ON when the shift control data $S_{n-1}^*$ is set at high levels, whereby the bits of the input data I1 to IN are shifted before being transmitted to the shift circuit $RSF_{n-2}$ at the following stage (in the shift state). As the data shift amount in the shift circuit $RSF_{n-1}$ is set to $2^{n-1}$ bits, data J2 in place of data J18, for instance, is allocated and data J1 in place of data J17 is allocated likewise. With the data selection, $2^{n-1}$ bits of input data J1 to JN can thus be shifted.

The other shift circuits included in the right shift circuit group 21 are arranged similarly except that the shift amount is set different.

Figure 26:
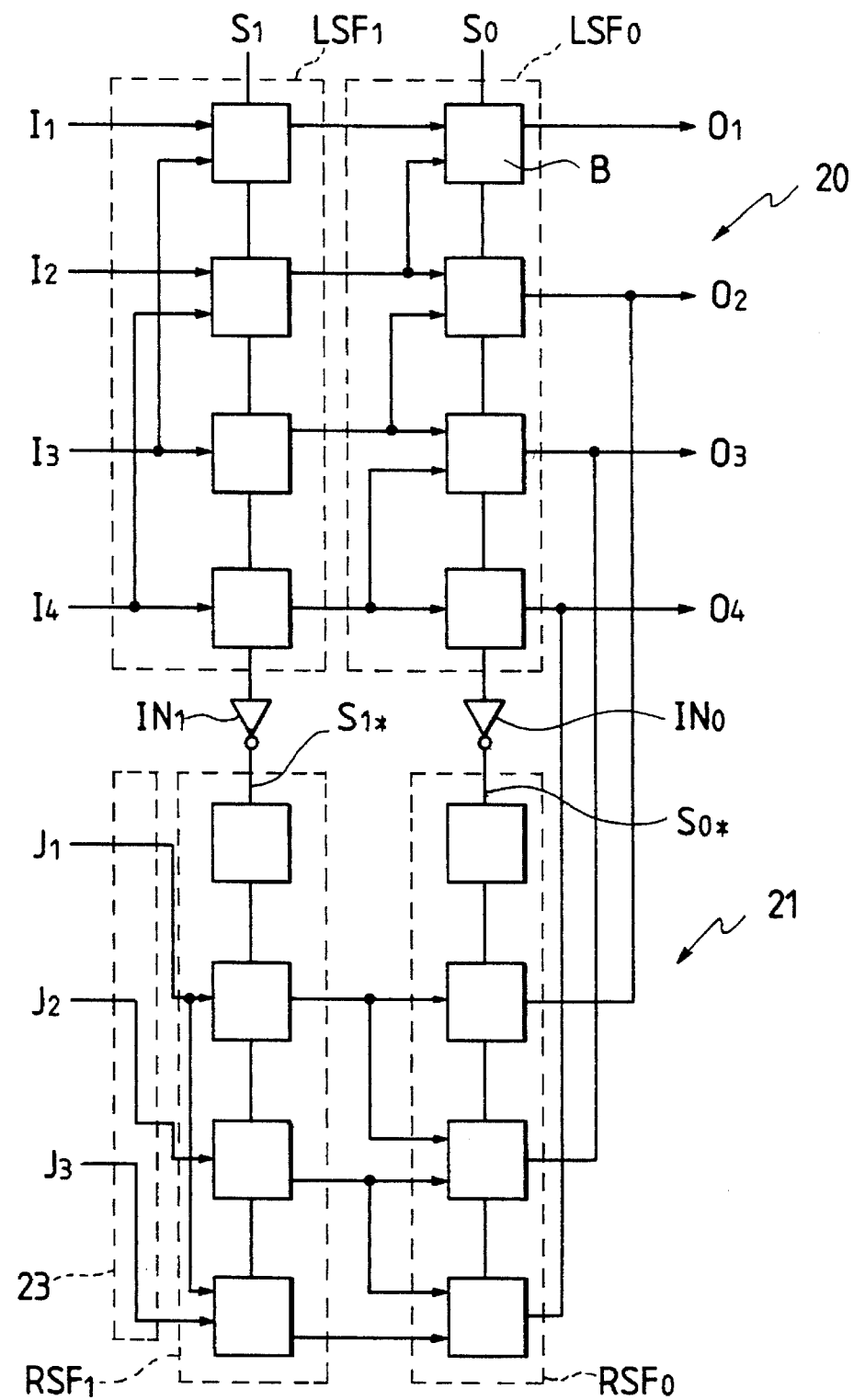
FIG. 26 is a block diagram illustrating an arrangement of the barrel shift circuit of FIG. 21 when the intended shift data has a 4-bit pattern.

Referring to FIG. 26, an arrangement of the barrel shift circuit with 4-bit input data will subsequently be described.

As shown in FIG. 26, the left shift circuit group 20 comprises a $2^1$-bit left shift circuit LSF1 for 2-bit shift of input data I1 to I4 when shift control data S1 is asserted to be high in level and a $2^0$-bit left shift circuit LSF01 for $2^0$ =1-bit shift of input data when shift control data S0 is asserted to be high in level. Like the left shift circuit group 20, the right shift circuit group 21 includes a 1-bit right shift circuit 23 for 1-bit shift of input data J1 to J3 when shift control data S1 is asserted to be high in level, a $2^1$-bit right shift circuit RSF1 for 2-bit shift of input data when the output data S1, of the inverter IN1 for inverting the shift control data $S_{n-1}$ is asserted to be high in level, and a $2^0$-bit right shift circuit RSF0 for 1-bit shift of input data when the output data S0* of the inverter IN0 for inverting the shift control data S0 is asserted to be high in level. The left shift circuits LSF1, LSF0 and the right shift circuits RSF1, RSF0 are formed with gate circuits for switching the data through state to and from the data shift state in response to the shift control data S1, S0. In other words, the left shift circuits LSF1, LSF0 and the right shift circuits RSF1, RSF0 include, as shown in FIGS. 22 and 23 respectively, a plurality of N-channel MOSFETs to be complementarily ON/OFF controlled in response to the shift control data. A plurality of blocks B in FIG. 26 represent a multiplexer formed with the combination of MOSFETs shown in FIG. 22 or 23, or those operated complementarily.

The 1-bit right shift circuit 23 functions as follows.

Figure 27:
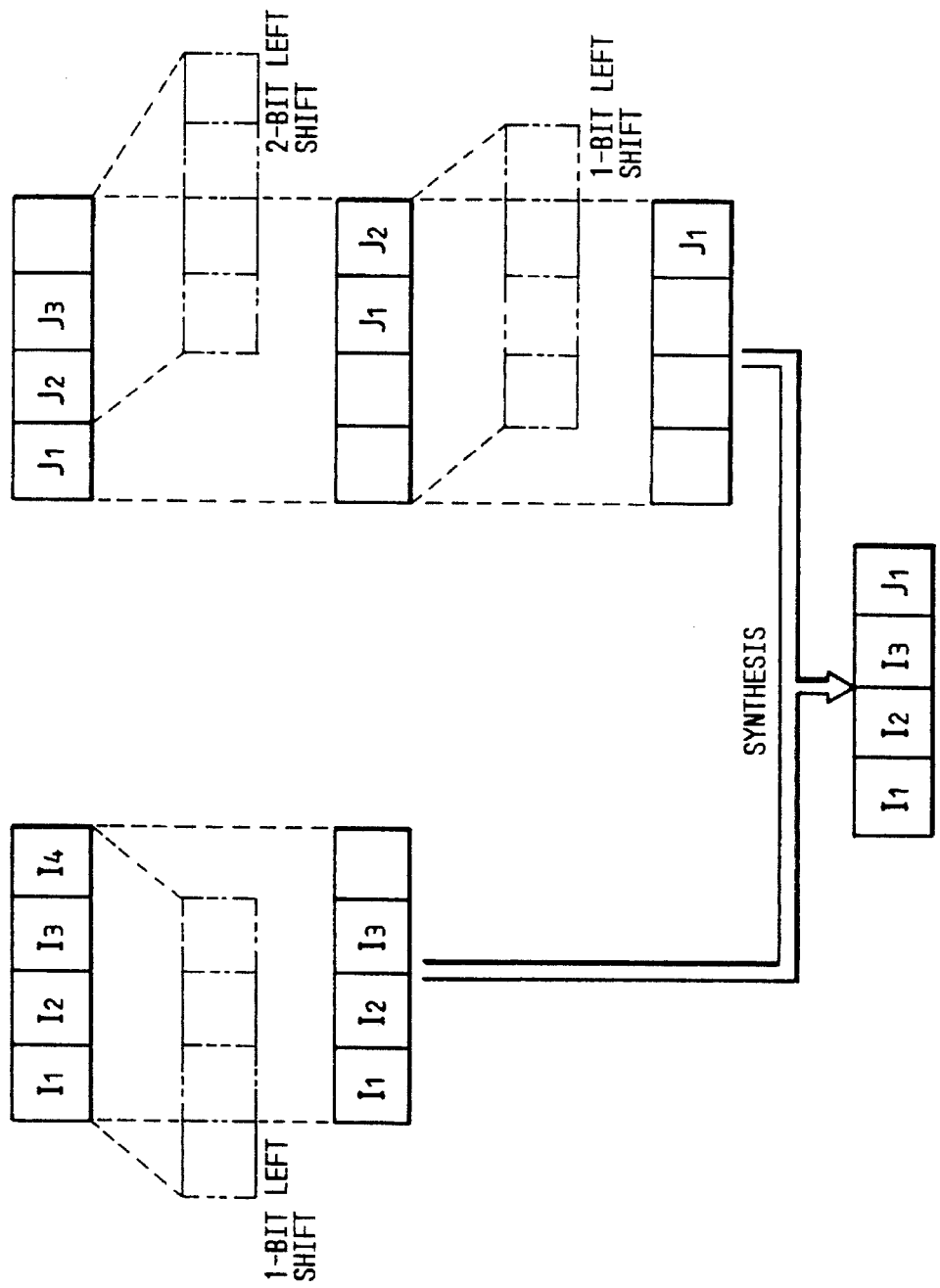
FIG. 27 is a diagram illustrating a combination of left and right shift outputs.

As shown in FIG. 27, for instance, input data I1, I2, I3, I4 are 1-bit shifted to the left when the shift control data [$S_1$, $S_2$] are set at [0, 1], which results in upper three bits I1, I2, I3. When the shift control data [0, 1] are inverted by the inverter IN1, IN2, [$S_1^*$, $S_2^*$] become [1, 0] and a 2-bit right shift is designated. In other words, other input data J1, J2, J3 are 2-bit shifted to the right become lower 2-bit J1, J2. As I3 and J1 compete with each other in this state, it is impossible to output four bits by combining the results of the left and right shifts. The result of the 2-bit right shift is further 1-bit shifted to the right to make the result a lower 1-bit J1, so that a synthetic 4-bit shift output of the 2-word data (I1, I2, I3, J1 in FIG. 27) is obtained. In this sense, the 1-bit shift by the 1-bit right shift circuit 23 is made effective when the 1-word shift output 01 to 04 is obtained by combining 2-word data shift outputs as in this embodiment.

The following effect is obtainable in this embodiment.

(6) Provided n is a positive integer, the left shift circuits LSF0, . . . , $LSF_{n-2}$, $LSF_{n-1}$ and the right shift circuits RSFO, . . . , $RSF_{n-2}$, $RSF_{n-1}$ as the n shift circuits for respectively shifting $2^i$-bit (i=0, 1, 2, . . . , n–1) data are arranged, whereby the operation of shifting optional bits of input data up to the corresponding $2^n$ bits by directly retrieving the n-bit coded shift control data without decoding them. Consequently, any decoder DEC for decoding n-bit shift control data SF shown in FIG. 30 can be dispensed with.

(7) As no decoder DEC for decoding the shift control data is needed because of the functional effect of (6), a signal delay in the decoder DEC is prevented and the operating speed of the barrel shifter circuit involved is made improvable. Moreover, the omission of the decoder DEC makes it possible to reduce the area occupied by the barrel shifter circuit on an LSI chip.

(8) The functional effect of (7) is also utilizable in a processor to which the barrel shift circuit according to the present invention is applied.

(9) In a case where the data shift outputs equivalent to two words are combined to obtain a shift output equivalent to one word as described in the embodiments above, the 1-bit shift circuit 23 for 1-bit shift of the input data, irrespective of the shift control data, is provided to ensure that the proper synthetic output is obtained.

Although the invention made by the present inventors has been described in concrete terms, the present invention is not limited to the foregoing embodiments but may be modified in various ways without departing from the spirit and scope thereof.

For instance, the data processing unit for bit field operation according to the present invention is not limited to 32-bit word data but may be 16-bit or 64-bit data. Moreover, the bit field operation of extracting and replacing an optional area of data need not necessarily be performed under the deposit or extract instruction but may appropriately be changed and the names of these instructions are not restricted to them.

Although it has been arranged to form the n shift circuits for shifting $2^i$-bit (i=0, 1, 2, . . . , n–1) data with the N-channel MOSFETs (FIGS. 21–29) in the embodiments above, transfer gates and further other semiconductor elements are also applicable thereto. Moreover, the 1-bit right shift circuit 23 need not necessarily positioned at the initial input stage of the right shift circuit group 21 but may be positioned at the final stage thereof or any other proper place. Although a description has been given of what includes the left and right shift circuit groups in the embodiments above, either one may be omitted. In this case, the 1-bit right shift circuit 23 is not particularly necessary.

When the embodiments of FIGS. 21–29 are applied to the preceding ones, the data indicating the shift amount from the instruction unit IU is employed as the shift control data. In this case, the decoder SDEC of FIG. 5 is not needed and those shown in FIGS. 21–29 are used as the barrel shifters BSFT1, BAFT2.

Although a description has mainly been given of the application of the present invention made by the present inventors to RISC processors and co-processors in the field of their utilization as a background, the invention is not limited to that field but may widely be applicable to CISC processors and logic LSIs.

The typical effect of the present invention may briefly be described as follows.

The barrel shifters are respectively used for the barrel shift of the input data and mask data generation. The shift amounts of both the barrel shifters are equalized so as to form the bit field operational arithmetic unit with the effect of contributing to improving the function and operating speed of the bit field operational arithmetic unit for the operation of extracting and replacing an optical area of data.

The transistor trains of the two sets of barrel shifters are set parallel to each other and stacked in laying out them in conformity with the 1-bit memory cell width of the register file, so that the area occupied by the bit field operational arithmetic unit can be reduced.

In parallel to the operation of shifting the input data by means of the first barrel shifter, the result obtained from the parallel process is selected before being subjected to the arithmetic shift, so that the operating speed of extracting an optional area of data can be increased.

With the logic of obtaining the decoded result using the mask bit, no circuit for converting the input into a signal at a complementary level can be dispensed with. Consequently, the decoder can be scaled down or otherwise the area occupied by the chip can be reduced.

Provided n is a positive integer, the n shift circuits for respectively shifting $2^i$-bit (i=0, 1, 2, ..., n−1) data are arranged, whereby the operation of shifting optional bits of input data up to the corresponding $N=2^n$ bits becomes possible. As a result, any decoder DEC for decoding n-bit shift control data can be dispensed with and the operating speed of the barrel shifter circuit involved is made improvable. Moreover, the area occupied by the barrel shifter circuit on an LSI chip is reducible.

What is claimed is:

1. A bit field operation unit formed on a semiconductor substrate comprising:

data providing means for providing predetermined data having a plurality of mask bits;

control means common to first and second barrel shifters for indicating a shifting amount to be shifted and including a control circuit which is used in common with the first barrel shifter and the second barrel shifter and which provides shift control signals for indicating the shifting amount for both of the first barrel shifter and the second barrel shifter simultaneously;

the first barrel shifter being coupled to the control means for shifting bits of input data in accordance with the shifting amount indicated by the control means, and for outputting the shifted input data having a plurality of input bits;

the second barrel shifter being coupled to the control means for shifting bits of control data in accordance with the shifting amount indicated by the control means, and for generating mask data having a plurality of control bits each of which corresponds to each of the plurality of input bits and each of which indicates whether or not a corresponding input bit is a bit to be masked;

providing means, coupled to said first barrel shifter, to said second barrel shifter and to said data providing means, for selectively providing mask bits instead of input bits indicated as bits to be masked by the mask data from the second barrel shifter;

a plurality of input data circuits, each of which has an output terminal for outputting an input signal; and a plurality of control data providing circuits, each of which has an output terminal for outputting a control signal, wherein the first barrel shifter includes a plurality of output terminals for outputting the shifted input data, a plurality of input terminals which are coupled to the output terminals of the input data providing circuits, respectively, and a first matrix which has a plurality of first metal-oxide semiconductor field-effect transistors (hereinafter "MOSFET") arranged in columns and rows, each of the columns including at least one of the plurality of output terminals, at least one of the plurality of input terminals, and at least one first MOSFET, coupled between the one input terminal and the one output terminal, each of the rows including a plurality of first MOSFETs having gates coupled to a shift control line to provide one of the shift control signals to the gates in common, wherein the second barrel shifter includes a plurality of output terminals for outputting the mask data, a plurality of input terminals which are coupled to the output terminals of the control data providing circuits, respectively, and a second matrix which has a plurality of second MOSFETs arranged in columns and rows, each of the columns including at least one of the plurality of output terminals, at least one of the plurality of input terminals, and at least one second MOSFET, coupled between the one input terminal and the one output terminal, each of the rows including a plurality of second MOSFETs having gates coupled to the shift control line to provide one shift control signal to the gates in common, and wherein MOSFET transistor trains of both the first and second barrel shifters are stacked parallel to each other in an area having the same width as a 1-bit cell.

2. The bit field operation unit according to claim 1, wherein the control circuit is a decoder which provides decoded signals to the first barrel shifter and the second barrel shifter as the shift control signals.

3. The bit field operation unit according to claim 1, wherein one of the columns of the first matrix is disposed in a first area adjacent to a second area in which one of the columns of the second matrix is disposed, and wherein one of the plurality of input data providing circuits are disposed in a third area adjacent to the first and second areas, a size of the third area in a predetermined direction being substantially equal to a size of the first and second areas in the predetermined direction.

4. The bit field operation unit according to claim 3, wherein the control circuit is a decoder which has a plurality of output terminals coupled to the shift control lines of the first and second matrices and which provides decoded signals to the shift control lines as the shift control signals.

5. A data processor which is formed on a semiconductor substrate and which executes bit field operations in response to bit field instructions, comprising:

control means responsive to instructions for generating control signals;

an internal bus;

a plurality of registers coupled to the internal bus; and a bit field operation unit, coupled to the internal bus and to the control means, for executing a bit field operation accordance with the bit field instructions, and including:

data providing means coupled to the internal bus, for providing predetermined data in accordance with the bit field instructions, the predetermined data having a plurality of mask bits, shifting amount indicating means responsive to the bit field instructions for indicating a shifting amount to be shifted including a decoder which provides decoded signals to a first barrel shifter and a second barrel shifter to indicate the shifting amount, selecting means, coupled to the internal bus, for selectively outputting data on the internal bus in response to one of the control signals, including a plurality of selecting circuits, each of which has an output terminal, the first barrel shifter being coupled to the selecting means and to the shfiting mount indicating means for shifting the outputted data from the selecting means in accordance with a shifting amount indicated by the shifting amount indicating means and for outputting the shifted data having a plurality of input bits, mask control data generating means for generating mask control data according to the bit field instructions, the second barrel shifter being coupled to the mask control data generating means and to the shifting amount indicating means for shifting the generated mask control data in accordance with a shifting amount indicated by the shifting amount indicating means, and for outputting the shifted mask control data having a plurality of mask control bits, each of which corresponds to each of the plurality of input bits and each of which indicates whether or not the corresponding input bit is a bit to be masked, and providing means, coupled to said first barrel shifter, to said second barrel shifter and to said data providing means, for selectively providing other mask bits instead of the input bits indicated as bits to be masked by the mask control bits from the second barrel shifter, wherein the mask control data generating means includes a plurality of control data providing circuits, each of which has an output terminal;

wherein the first barrel shifter includes a plurality of output terminals for outputting the shifted data, a plurality of input terminals which are coupled to the output terminals of the selecting circuits, respectively, and a first matrix which has a plurality of first MOSFETs arranged in columns and rows, each of the columns including at least one of the output terminals, at least one of the input terminals, and at least one first MOSFET, coupled between the one input terminal and the one output terminal, each of the rows including a plurality of first MOSFET having gates coupled to a shift control line to provide one of the decoded signals to the gates in common, and wherein the second barrel shifter includes a plurality of output terminals for outputting the shifted mask control data, a plurality of input terminals which are coupled to the output terminals of the control data providing circuits, respectively, and a second matrix which has a plurality of second MOSFETs arranged in columns and rows, each of the columns including at least one of the output terminals, at least one of the input terminals, and at least one second MOSFET, coupled between the one output terminal and the one input terminal, each of the rows including a plurality of second MOSFETs having gates coupled to the shift control line to provide the one decoded signal to the gates in common.

6. The data processor according to claim 5, wherein one of the columns of the first matrix is disposed in a first area adjacent to a second area in which one of the columns of the second matrix is disposed; and wherein one of the plurality of selecting circuits and one of the plurality of control data providing circuits are disposed in a third area adjacent to the first and second areas, a size of the third area in a predetermined direction being substantially equal to a size of the first and second areas in the predetermined direction.

7. The data processor according to claim 5, wherein the bit field instruction includes a first portion for indicating one of the registers and a second portion for indicating one of a third portion included in the bit field instruction and a register, wherein the contents of the indicated one by the first portion are supplied to the selecting means, and wherein contents of the indicated one by the second portion are supplied to the decoder to generate the decoded signals.

8. A bit field operation unit formed on a semiconductor substrate, comprising:

a mask data circuit providing predetermined data having a plurality of mask bits;

a decoder providing decoded signals which indicate a shifting amount to be shifted;

a first barrel shifter which is coupled to the decoder, which shifts bits of input data in accordance with the shifting amount indicated by the decoded signals and which outputs the shifted input data having a plurality of input bits;

a second barrel shifter which is coupled to the decoder, which shifts bits of control data in accordance with the shifting amount indicated by the decoded signals and which outputs the shifted control data having a plurality of control bits, wherein each of the control bits indicates whether or not a corresponding input bit among the plurality of input bits is a bit to be masked;

a selector which is coupled to the first barrel shifter, to the second barrel shifter and to the mask data circuit and which selects other mask bits instead of the input bits indicated as bits to be masked by the control bits from the second barrel shifter;

a plurality of input data circuits, each of which has an output node for providing a bit among the input data;

a plurality of control data circuits, each of which has an output node for providing a bit among the control data; and a plurality of signal lines which are coupled to the decoder and to which the decoded signals are provided from the decoder;

wherein the first barrel shifter includes a plurality of columns, each of which has an input terminal coupled to the output node of an input data circuit, an output terminal coupled to the selector, a first MOSFET coupled between the input terminal and the output terminal and a second MOSFET coupled between the input terminal of a different column and the output terminal, wherein the second barrel shifter includes a plurality of columns, each of which has an input terminal coupled to the output node of a control data circuit, an output terminal coupled to the selector, a third MOSFET coupled between the input terminal and the output terminal and a fourth MOSFET coupled between the input terminal of a different column and the output terminal, wherein the signal lines are coupled to gates of the first MOSFET, the second MOSFET, the third MOSFET and the fourth MOSFET, and wherein each of the plurality of columns of the first barrel shifter and each of the plurality of columns of the second barrel shifter are stacked parallel to each other in a width required by one of the input data circuit and the control data circuit.

9. The bit field operation unit according to claim 8, wherein first MOSFETs in the plurality of columns and third MOSFETs in the plurality of columns have gates coupled to one of the signal lines, and wherein second MOSFETs in the plurality of columns and fourth MOSFETs in the plurality of columns have gates coupled to one of the signal lines.

10. The bit field operation unit according to claim 8, wherein each of the plurality of input data circuits includes a unit register and a unit selector, and wherein each of the plurality of control data circuits includes a unit register and a unit selector.

* * * * *